United States Patent
Makino

(10) Patent No.: US 7,335,323 B2
(45) Date of Patent: Feb. 26, 2008

(54) METHOD FOR PRODUCING CORDIERITE CERAMIC BODY USING RECLAIMED CERAMIC STARTING MATERIAL

(75) Inventor: Kentaro Makino, Kuwana (JP)

(73) Assignee: DENSO CORPORATION, Kariya (JP)

( * ) Notice: Subject to any disclaimer, the term of this patent is extended or adjusted under 35 U.S.C. 154(b) by 215 days.

(21) Appl. No.: 10/763,158

(22) Filed: Jan. 26, 2004

(65) Prior Publication Data

US 2004/0151872 A1    Aug. 5, 2004

(30) Foreign Application Priority Data

Jan. 24, 2003  (JP)  ............................. 2003-016622

(51) Int. Cl.
*C04B 41/00* (2006.01)
*C04B 39/00* (2006.01)

(52) U.S. Cl. ................................. 264/37.29; 264/37.3

(58) Field of Classification Search ........ 264/630–631, 264/37.1, 37.29, 638, 37.3
See application file for complete search history.

(56) References Cited

U.S. PATENT DOCUMENTS

| | | | |
|---|---|---|---|
| 4,476,236 A * | 10/1984 | Inoguchi et al. ............ 501/118 |
| 4,851,376 A | 7/1989 | Asami et al. |
| 5,061,421 A * | 10/1991 | Girmscheid et al. ........ 264/667 |
| 5,433,903 A | 7/1995 | Hauser et al. |
| 5,552,349 A * | 9/1996 | Ichii et al. ...................... 501/9 |
| 5,679,292 A * | 10/1997 | Nisimura ..................... 501/119 |
| 5,766,524 A * | 6/1998 | Rashwan et al. ......... 264/37.19 |
| 5,997,984 A * | 12/1999 | Koike et al. ................. 428/116 |
| 6,284,188 B1 * | 9/2001 | Andou et al. ................ 264/631 |
| 6,300,263 B1 * | 10/2001 | Merkel ............................ 501/9 |
| 6,506,336 B1 * | 1/2003 | Beall et al. .................. 264/630 |
| 6,638,051 B2 | 10/2003 | Yamaguchi et al. |
| 6,773,657 B2 * | 8/2004 | Beall et al. .................. 264/628 |
| 2003/0134084 A1 * | 7/2003 | Ichikawa et al. ............ 428/116 |
| 2004/0131512 A1 * | 7/2004 | Abe et al. .................... 422/180 |
| 2004/0151872 A1 * | 8/2004 | Makino ....................... 428/116 |
| 2004/0179994 A1 * | 9/2004 | Fenouil et al. .............. 423/608 |
| 2005/0255288 A1 * | 11/2005 | Noguchi et al. ............ 428/116 |

FOREIGN PATENT DOCUMENTS

| | | |
|---|---|---|
| CN | 1073133 A | 6/1993 |
| JP | 62-207758 | 9/1987 |
| JP | 3-72032 | 11/1991 |
| JP | 8-119726 | 5/1995 |

(Continued)

*Primary Examiner*—Carlos Lopez
(74) *Attorney, Agent, or Firm*—Nixon & Vanderhye P.C.

(57) ABSTRACT

A reclaimed ceramic starting material is produced from scrap generated in a method for producing a cordierite ceramic body. The scrap is an unnecessary part generated in a cutting step of cutting a dried ceramic molded article into a predetermined length or a defective dried ceramic molded article generated in a drying step of drying an extruded ceramic material. The scrap is crushed. From a powder obtaind by crushing, at least particles smaller than the predetermined size are removed to produce a reclaimed powder having a particle size within a predetermined size range. The reclaimed powder is used as a reclaimed ceramic starting material. Instead of crushing, the scrap may be fired at a temperature where a contained binder can burn away to obtain a reclaimed powder. The reclaimed ceramic starting material ensures no deterioration in the quality of a cordierite ceramic body produced therefrom.

3 Claims, 16 Drawing Sheets

FOREIGN PATENT DOCUMENTS

| | | |
|---|---|---|
| JP | 08-325063 | 12/1996 |
| JP | 10-305416 | 11/1998 |
| JP | 2000-280217 | 10/2000 |
| JP | 2000-302533 | 10/2000 |
| JP | 2002-144313 | 5/2002 |

* cited by examiner

METHOD FOR PRODUCING CORDIERITE CERAMIC BODY USING RECLAIMED CERAMIC STARTING MATERIAL

BACKGROUND OF THE INVENTION

1. Field of the Invention

The present invention relates to a reclaimed ceramic starting material produced from scrap generated in a method for producing a cordierite ceramic body and to a method for producing a cordierite ceramic body by using the reclaimed ceramic starting material.

2. Description of the Related Art

Cordierite ceramics have excellent heat characteristics such that the heat resistance is high and, at the same time, the coefficient of thermal expansion is stably low over a wide temperature range. By making good use of such heat characteristics, cordierite ceramic bodies having a honeycomb structure are being developed as a support of a catalyst for removing harmful substances such as HC, CO and $NO_x$ from the exhaust gas of internal combustion engine.

In producing this cordierite ceramic body, a method of introducing a binder into a virgin starting material powder to form a slurry, molding the slurry, drying it to obtain a dried molded article and calcining the dried molded article to produce a cordierite ceramic body is conventionally well known.

On the other hand, in the method for producing a cordierite ceramic body, effective utilization of scraps, defectives, and the like, generated in the molding process is demanded in view of reduction in the starting material cost or resource conservation.

To meet this requirement, a method for producing a cordierite ceramic body by utilizing a reclaimed ceramic starting material obtained by reclaiming a dried material before calcining in the above-described production process has been proposed. See U.S. Pat. No. 4,851,376.

SUMMARY OF THE INVENTION

However, conventional methods for producing a cordierite ceramic body by utilizing the reclaimed ceramic starting material have the following problems. That is, the cordierite ceramic body produced using the reclaimed ceramic starting material is sometimes deteriorated in the quality, for example, as shown in Table 6 of the above-mentioned United States patent, the coefficient of thermal expansion is deteriorated (becomes large).

The present invention has been made by taking account of these problems in conventional techniques and an object of the present invention is to provide a reclaimed ceramic starting material of causing no deterioration in the quality of cordierite ceramic body, and a method for producing a cordierite ceramic body by using the reclaimed ceramic starting material.

The first invention is a method for producing a cordierite ceramic body, comprising: a mixing step of mixing a ceramic starting material and a binder to produce a mixed starting material, a humidifying step of adding a humidifying liquid to the mixed starting material to produce a humidified starting material, a molding step of kneading and extruding the humidified starting material to mold a ceramic molded article, a drying step of drying the ceramic molded article, a cutting step of cutting off an unnecessary part of the ceramic molded article after drying and thereby machining the ceramic molded article into a predetermined length, and a calcining step of calcining the ceramic molded article having the predetermined length to produce a ceramic calcined body, wherein the method further comprises a reclaiming step of crushing the unnecessary part generated in the cutting step and then classifying to remove at least particles smaller than a predetermined size to produce a reclaimed powder composed of particles falling in a predetermined size range, and the reclaimed powder is used at least as a part of the ceramic starting material in the mixing step.

The method of the first invention is characterized in that in the reclaiming step, particles smaller than a predetermined size are removed by classification from particles obtained by crushing the unnecessary part and thereby a reclaimed powder is produced.

By maintaining the particle size of the reclaimed powder in the predetermined size range, the bad influence of the reclaimed powder, on the quality of a cordierite ceramic body produced using the reclaimed powder, can be suppressed.

That is, the present inventors have experimentally found and taken notice of a significant correlation that if the particle size of the reclaimed powder is too small, the quality of cordierite ceramic body decreases.

Furthermore, the method of the first invention is characterized in that in the mixing step, a virgin ceramic starting material, the reclaimed powder produced in the reclaiming step and a binder are mixed to produce the mixed starting material.

That is, according to the method of the first invention, an existing production apparatus of dealing with only a virgin starting material can be used as it is and this is efficient.

The second invention is a method for producing a cordierite ceramic body, comprising: a mixing step of mixing a ceramic starting material and a binder to produce a mixed starting material, a humidifying step of adding a humidifying liquid to the mixed starting material to produce a humidified starting material, a molding step of kneading and extruding the humidified starting material to mold a ceramic molded article, a drying step of drying the ceramic molded article, a cutting step of cutting off an unnecessary part of the ceramic molded article after drying and thereby machining the ceramic molded article into a predetermined length, and a calcining step of calcining the ceramic molded article having the predetermined length to produce a ceramic calcined body, wherein the method further comprises a powdering step of firing the unnecessary part generated in the cutting step to cause disappearance of the binder present in the unnecessary part and result in a powder form to produce a reclaimed powder, and the reclaimed powder is used at least as a part of the ceramic starting material in the mixing step.

The method of the second invention is characterized in that in the powdering step, the unnecessary part recovered is fired and thereby powdered to produce a reclaimed powder.

That is, in the powdering step, the binder contained in the unnecessary part is caused to disappear, whereby the reclaimed powder can be produced. The reclaimed powder, produced without crushing or the like, has a low possibility of incurring deterioration in the quality of the ceramic starting material. Also, by removing the binder, a quality close to that of the virgin starting material can be realized.

Therefore, the quality such as thermal expansion coefficient differs less between a cordierite ceramic body produced using this reclaimed powder and a cordierite ceramic body produced using only a virgin starting material.

Furthermore, the method of the second invention is characterized in that a mixture of the reclaimed powder and a virgin starting material is used as the ceramic starting material in the mixing step.

That is, according to this method, an existing production apparatus of dealing with only a virgin starting material can be used as it is and this is efficient.

The third invention is a method for producing a cordierite ceramic body, comprising: a mixing step of mixing a ceramic starting material and a binder to produce a mixed starting material, a humidifying step of adding a humidifying liquid to the mixed starting material to produce a humidified starting material, a molding step of kneading and extruding the humidified starting material to mold a ceramic molded article, a drying step of drying the ceramic molded article, a cutting step of cutting off an unnecessary part of the ceramic molded article after drying and thereby machining the ceramic molded article into a predetermined length, and a calcining step of calcining the ceramic molded article having the predetermined length to produce a ceramic calcined body, wherein the humidifying step and the molding step are performed together using a molding machine designed to knead the mixed starting material and extrude it through a die, and the unnecessary part generated in the cutting step as well as the humidifying liquid is supplied into the molding machine.

The method of the third invention is characterized in that the unnecessary part is supplied directly into the molding machine and re-kneaded.

That is, in this method, the unnecessary part is directly re-kneaded by the molding machine without any pretreatment. By this re-kneading, a ceramic starting material and a binder contained in the unnecessary part are less deteriorated.

Therefore, according to the third invention, the produced cordierite ceramic body is less deteriorated in the coefficient of thermal expansion. Furthermore, according to this method, not only a ceramic starting material contained in the unnecessary part but also a binder contained in the unnecessary part can be re-used.

However, in this method, the dried and hardened unnecessary part must be kneaded and therefore, modification of the apparatus is sometimes necessary, such as intensification of kneading torque of the molding machine or enhancement of a cooling device to cope with heat generation during kneading.

The fourth invention is a reclaimed ceramic starting material produced from a scrap generated in a method for producing a cordierite ceramic body, wherein the method comprises a mixing step of mixing a ceramic starting material and a binder to produce a mixed starting material, a humidifying step of adding a humidifying liquid to the mixed starting material to produce a humidified starting material, a molding step of kneading and extruding the humidified starting material to mold a ceramic molded article, a drying step of drying the ceramic molded article, a cutting step of cutting off an unnecessary part of the ceramic molded article after drying and thereby machining the ceramic molded article into a predetermined length, and a calcining step of calcining the ceramic molded article having the predetermined length to produce a ceramic calcined body; wherein the scrap is the unnecessary part generated in the cutting step or a defective dried ceramic molded article generated as a defective in the drying step; and wherein the reclaimed ceramic starting material is a reclaimed powder composed of particles falling in a predetermined size range obtained by crushing at least either one of the unnecessary part and the defective dried ceramic molded article and removing at least particles smaller than the predetermined size.

The reclaimed ceramic starting material of the fourth invention is a powder prepared by removing at least particles smaller than a predetermined size from a powder obtained by crushing the unnecessary part generated in the cutting step or the defective dried ceramic molded article generated in the drying step.

This reclaimed ceramic starting material can be easily applied to an existing production process using a virgin starting material and this is a material capable of producing a cordierite ceramic body excellent in the coefficient of thermal expansion.

The fifth invention is a reclaimed ceramic starting material produced from scrap generated in a method for producing a cordierite ceramic body, wherein the method comprises a mixing step of mixing a ceramic starting material and a binder to produce a mixed starting material, a humidifying step of adding a humidifying liquid to the mixed starting material to produce a humidified starting material, a molding step of kneading and extruding the humidified starting material to mold a ceramic molded article, a drying step of drying the ceramic molded article, a cutting step of cutting off an unnecessary part of the ceramic molded article after drying and thereby machining the ceramic molded article into a predetermined length, and a calcining step of calcining the ceramic molded article having the predetermined length to produce a ceramic calcined body; wherein the scrap is the unnecessary part generated in the cutting step or a defective dried ceramic molded article generated as a defective in the drying step; and wherein the reclaimed ceramic starting material is a reclaimed powder produced by firing at least either one of the unnecessary part and the defective dried ceramic molded article to cause disappearance of the binder present in the unnecessary part or defective dried ceramic molded article and result in a powder form.

The reclaimed ceramic starting material of the fifth invention is a reclaimed powder obtained by firing the recovered unnecessary part to result in a powder form. This reclaimed powder obtained by reclamation without crushing or the like has less possibility of incurring deterioration in the quality of the ceramic starting material. Also, by causing the binder to disappear, a reclaimed ceramic starting material close to a virgin starting material can be produced.

Therefore, the quality such as thermal expansion coefficient differs less between a cordierite ceramic body produced using this reclaimed powder and a cordierite ceramic body produced using only a virgin starting material.

DETAILED DESCRIPTION OF THE INVENTION

Figure 1:
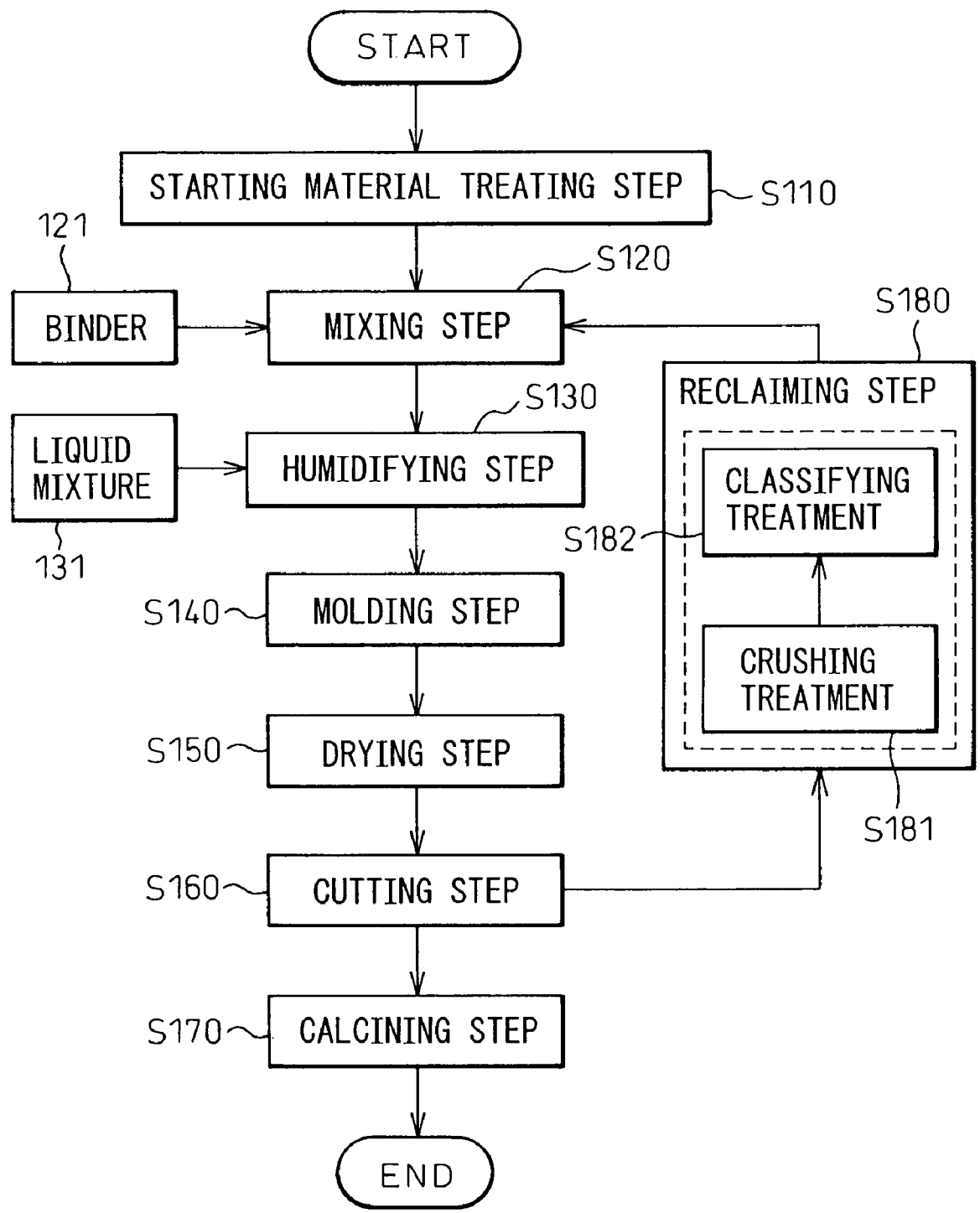
FIG. 1 is a flow chart showing the production process of a cordierite ceramic body in Example 1.

In the first invention, the size of particles of the reclaimed powder can be defined, for example, as the maximum dimension in a cross-sectional shape nearly orthogonal to the longitudinal direction of particles of the reclaimed powder. In the following, this size of particles of the reclaimed powder is appropriately referred to as the particle size of the reclaimed powder.

The particle size of the reclaimed powder is preferably from 1 to 5 mm. By setting the particle size of the reclaimed powder to 1 mm or more, the produced cordierite ceramic body can be prevented from deterioration in the quality such as coefficient of thermal expansion. Also, by setting the particle size of the reclaimed powder to 5 mm or less, various troubles in the molding step can be prevented and, for example, air conveyance commonly employed as a method for conveying a powder material can be used with good efficiency.

The present inventors have intensively performed various experiments and, as a result, it has been found that the critical point causing deterioration in the thermal expansion coefficient of a cordierite ceramic body is a particle size of 1 mm of the reclaimed powder and a ceramic cordierite body produced from a reclaimed powder having a particle size of less than 1 mm is poor in the quality. This is described in detail later in Example 2.

The reclaimed powder particles having a particle size exceeding 5 mm may form more huge secondary particles by aggregation and this may induce troubles in the molding step, such as clogging of the molding die.

Furthermore, if the particle size exceeds 5 mm, the gap between reclaimed powder particles becomes large and, for example, air may pass through the gap at the air conveyance to decrease the conveyance efficiency.

The classifying treatment may be performed by combining the treatment of removing particles smaller than a predetermined size with a treatment of removing particles larger than a predetermined size. In this case, not only particles smaller than a predetermined size but also particles larger than a predetermined size are removed, so that the particle size of the reclaimed powder can be unfailingly made to fall within a predetermined range.

The classifying treatment can be performed, for example, by a filter having a filter net or the like. In order to remove particles smaller than a predetermined particle size, this may be attained by removing particles passed through the filter net from particles obtained by crushing the unnecessary part. On the other hand, in order to remove particles larger than a predetermined particle size, this may be attained by removing particles not passed through the filter net but remaining in the filter.

Other than the method using a filter, the classifying treatment may also be performed by air classification or the like.

It is difficult to perfectly classify the particle size by any of these classifying treatments. That is, the classifying treatment in the first invention is a treatment performed by using an apparatus physically constructed with an aim to provide an operational effect of sorting out a predetermined particle size.

Therefore, the selected particle group may happen to contain a slight amount of particles smaller than the predetermined particle size.

In this way, the concept of the reclaimed powder in the first invention is of course not limited to the case where all particles of the reclaimed powder have the desired particle size, but also includes the case where in view of properties of the classifying treatment, a slight amount of particles out of the desired particle size are contained even after the classifying treatment.

The humidifying liquid used in the humidifying step is an additive for improving the lubricity and the like of the material in the molding step. As this humidifying liquid, a mixture of oils such as salad oil, water-soluble oils or the like can be used.

In the mixing step, the content of the reclaimed powder in the ceramic starting material is preferably from 1 to 30 parts by weight based on 100 parts by weight of a virgin starting material.

Particles obtained by crushing an unnecessary part of the ceramic molded article after drying is in the "smooth" state.

However, primary particles in the reclaimed powder is covered with a binder which was once dissolved and formed into a film.

Therefore, when the humidifying liquid comprising water, oil or the like comes into contact with the reclaimed powder in the humidifying step, the filmy binder exerts its tackiness and the reclaimed powder particles themself become sticky. If the case is so, the reclaimed powder particles may adhere to each other to form huge secondary particles.

When the content of the reclaimed powder is from 1 to 30 parts by weight based on 100 parts by weight of a virgin starting material and the powder of virgin starting material is present in a large amount in comparison with the reclaimed powder, the surface of the "sticky" reclaimed powder particles can be covered with virgin starting material particles and individual reclaimed powder particles can be laid in the "smooth" or dry state.

Accordingly, in this case, the reclaimed powder particles can be prevented from aggregating in the humidifying step. When the aggregation of reclaimed powder particles can be prevented, this can obviate various problems which may be brought about by the formation of huge secondary particles, such as worsening of moldability, clogging of the molding die or blockage in the molding machine.

The cordierite ceramic body preferably has a honeycomb structure.

In this case, the operational effect of the first invention is particularly effective, that is, the cordierite ceramic body which readily undergoes distortion, cracking or the like due to heat can maintain a good coefficient of thermal expansion.

In the powdering step of the method for producing a cordierite ceramic body of the second invention, the unnecessary part is preferably fired at a temperature of 600 to 1,000 degrees centigrade.

In this case, the binder contained in the unnecessary part can be appropriately caused to disappear.

If the temperature is less than 600 degrees centigrade, the binder contained in the unnecessary part may not be completely removed.

On the other hand, if the temperature exceeds 1,000 degrees centigrade, the ceramic material constituting the unnecessary part may be sintered.

The unnecessary part is more preferably fired at a temperature of 600 to 700 degrees centigrade.

In this case, the crystal water in the reclaimed powder can be prevented from vaporization.

The input of the binder in the mixing step or the input of the humidifying liquid in the humidifying step is preferably changed according to the content of the reclaimed powder in the ceramic starting material.

The crystal water in the reclaimed powder may be vaporized upon firing to come short and the humidified starting material comprising the ceramic starting material containing the reclaimed powder may suffer from insufficient lubricity in the molding step.

When the input of the binder or humidifying liquid is changed according to the content of the reclaimed powder in the ceramic starting material, the binder or humidifying liquid can compensate for the lubricity of the humidified starting material in the molding step.

In other words, as the content of the reclaimed powder in the ceramic starting material is higher, the input of the humidifying liquid supplied is preferably larger.

In the ceramic starting material of the mixing step, the reclaimed powder content is preferably from 1 to 30 parts by weight based on 100 parts by weight of the virgin starting material.

In this case, the difference in the quality between the cordierite ceramic body produced by the method of the second invention and the cordierite ceramic body produced by using only a virgin starting material can be reduced.

Furthermore, the reclaimed powder content in the above-described range well matches the general material yield rate in the production process of a cordierite ceramic body and therefore, the production process by the method of the second invention can be stably and efficiently continued.

The cordierite ceramic body preferably has a honeycomb structure.

In this case, the operational effect of the second invention can be particularly effective, that is, the cordierite ceramic body which readily undergoes cracking or the like due to thermal distortion can maintain a good coefficient of thermal expansion.

In the method for producing a cordierite ceramic body of the third invention, the cooling capacity for cooling the humidified material in the molding machine is preferably controlled according to the input of the unnecessary part supplied into the molding machine.

In this case, the unnecessary part which requires a powerful kneading torque and generates a large quantity of heat during kneading can be properly kneaded. Also, by preventing the temperature from elevating during kneading, the deterioration of the humidified material can be obviated.

In other words, in order to keep nearly constant the temperature of the humidified material in the molding machine, as the input of the unnecessary part is larger, the cooling capacity for cooling the humidified material in the molding machine is preferably made larger.

The cordierite ceramic body preferably has a honeycomb structure.

In this case, the operational effect of the third invention is particularly effective, that is, the cordierite ceramic body which readily undergoes distortion, cracking or the like due to heat can maintain a good coefficient of thermal expansion.

In the fourth invention, the size of the particles of the reclaimed powder can be defined, for example, as the maximum dimension in a cross-sectional shape nearly orthogonal to the longitudinal direction of the particles of the reclaimed powder.

The maximum dimension of a cross section nearly orthogonal to the longitudinal direction of particles of the reclaimed powder is preferably from 1 to 5 mm.

In this case, as described with respect to the first invention, the produced ceramic cordierite body undergoes less deterioration in the quality, such as deterioration of thermal expansion coefficient.

Here, the above-described maximum dimension is appropriately expressed as the particle size of the reclaimed powder.

Formation of more huge secondary particles due to aggregation of the reclaimed powder particles less occurs and troubles in the molding step, such as clogging of molding die, are less induced.

Furthermore, by setting the particle size of the reclaimed powder to 5 mm or less, for example, air conveyance commonly employed as a method for conveying a material in a powder form can be used with good efficiency.

If particles having a particle size less than 1 mm are contained in the reclaimed powder, the produced cordierite ceramic body may be deteriorated in the thermal expansion coefficient or the like.

On the other hand, if particles having a particle size exceeding 5 mm are contained in the reclaimed powder, huge secondary particles resulting from aggregation of reclaimed powder particles may cause an adversely effect in the molding step.

Furthermore, the gap between reclaimed powder particles becomes large and, for example, at the air conveyance of conveying a material in a conveying pipe by passing air under pressure into the conveying pipe, air may pass through the gap to decrease the conveyance efficiency.

The cordierite ceramic body preferably has a honeycomb structure.

In this case, the operational effect of the fourth invention is particularly effective, that is, a good coefficient of thermal expansion can be maintained as the starting material for a honeycomb structure cordierite ceramic body which readily undergoes distortion, cracking or the like due to heat.

In the reclaimed ceramic starting material of the fifth invention, the reclaimed powder is preferably obtained by the firing at a temperature of 600 to 1,000 degrees centigrade.

In this case, the binder contained in the unnecessary part can be appropriately removed.

If the temperature is less than 600 degrees centigrade, the binder contained in the unnecessary part may not be completely removed.

On the other hand, if the temperature exceeds 1,000 degrees centigrade, the ceramic material constituting the unnecessary part may be sintered.

The cordierite ceramic body preferably has a honeycomb structure.

In this case, the operational effect of the fifth invention is particularly effective, that is, a good coefficient of thermal expansion can be maintained as the starting material for a honeycomb structure cordierite ceramic body which readily undergoes distortion, cracking, or the like, due to heat.

EXAMPLES

Example 1

The method for producing the cordierite ceramic body 8 (FIG. 2) of this Example is described by referring to FIGS. 1 to 6.

As shown in FIG. 1, the method for producing the cordierite ceramic body 8 of this Example comprises a mixing step S120 of mixing a ceramic starting material and a binder 121 to produce a mixed starting material, a humidifying step S130 of adding a humidifying liquid 131 to the mixed starting material to produce a humidified starting material 73, a molding step S140 of kneading and extruding the humidified starting material 73 to mold a ceramic molded article 88 (FIG. 4), a drying step S150 of drying the ceramic molded article 88, a cutting step S160 of cutting out an unnecessary part 888 of the ceramic molded article 88 and machining the ceramic molded article 88 into a predetermined length (FIG. 5), and a calcining step S170 of calcining the ceramic molded article 88 to produce a ceramic calcined body.

Furthermore, a reclaiming step S180 of performing a crushing treatment S181 of crushing the unnecessary part 888 generated in the cutting step S160 and then performing a classifying treatment S182 of removing at least particles smaller than a predetermined size to produce a reclaimed powder 74 composed of particles falling in a predetermined size range is carried out.

The reclaimed powder 74 is used at least as a part of the ceramic starting material in the mixing step S120.

This is described in detail below.

In this Example, a cordierite ceramic body 8 is produced using a ceramic starting material containing the reclaimed powder 74, which is a reclaimed ceramic starting material, by a production method comprising, as described above, a combination of the mixing step S120, the humidifying step S130, the molding step S140, the drying step S150, the cutting step S160 and the calcining step S170.

Particularly, in the crushing treatment S181 of the reclaiming step S180 of this Example, the unnecessary part 888 is crushed such that the maximum dimension (hereinafter, appropriately referred to as a particle size) of the cross section nearly orthogonal to the longitudinal direction of the particle becomes 5 mm or less. The classifying treatment S182 is characterized in that at least particles having a particle size less than 1 mm are removed.

By the combination of the crushing treatment S181 and the classifying treatment S182, the reclaimed powder 74 composed of particles having a particle size of 1 to 5 mm is produced.

Figure 2:
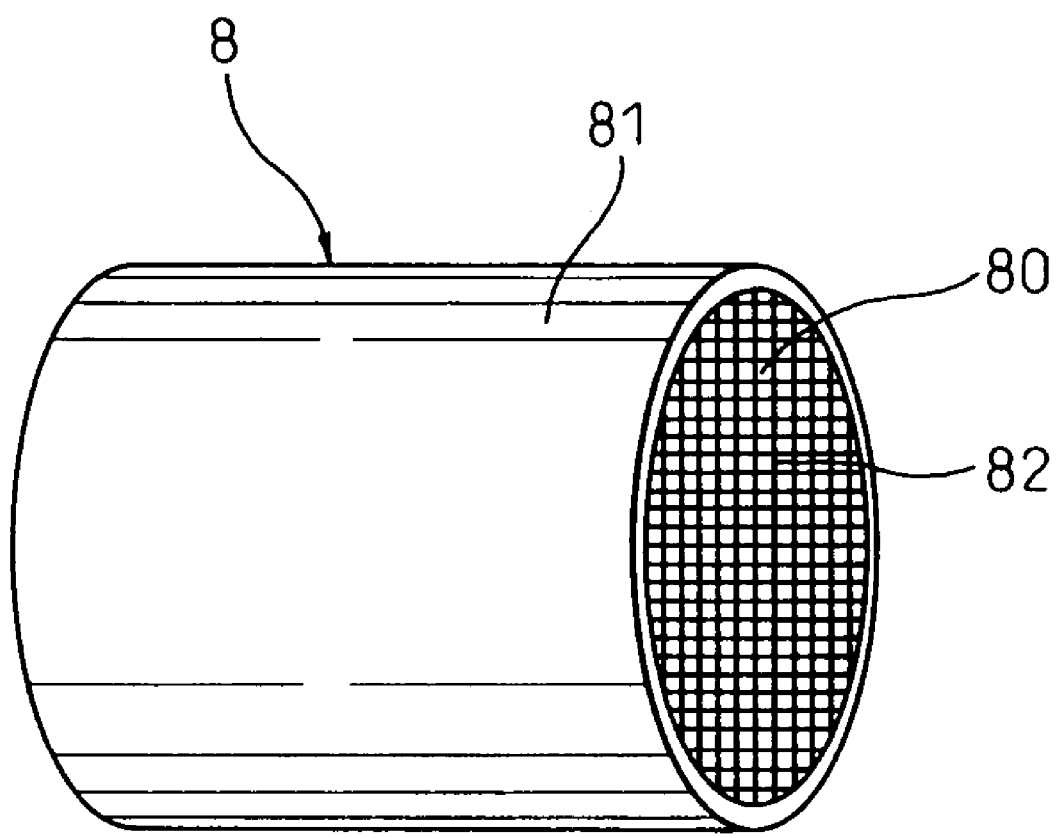
FIG. 2 is a perspective view showing the cordierite ceramic body in Example 1.

As shown in FIG. 2, the cordierite ceramic body 8 produced in this Example comprises an outer covering 81, partition walls 82 gridwise disposed inside the outer covering 81, and numerous cells 80 defined by the partition walls 82 and piercing in the axial direction.

The virgin ceramic starting material 70 used in this Example comprises powders of talc, kaolin and alumina which are components of a cordierite after calcining.

Figure 3:
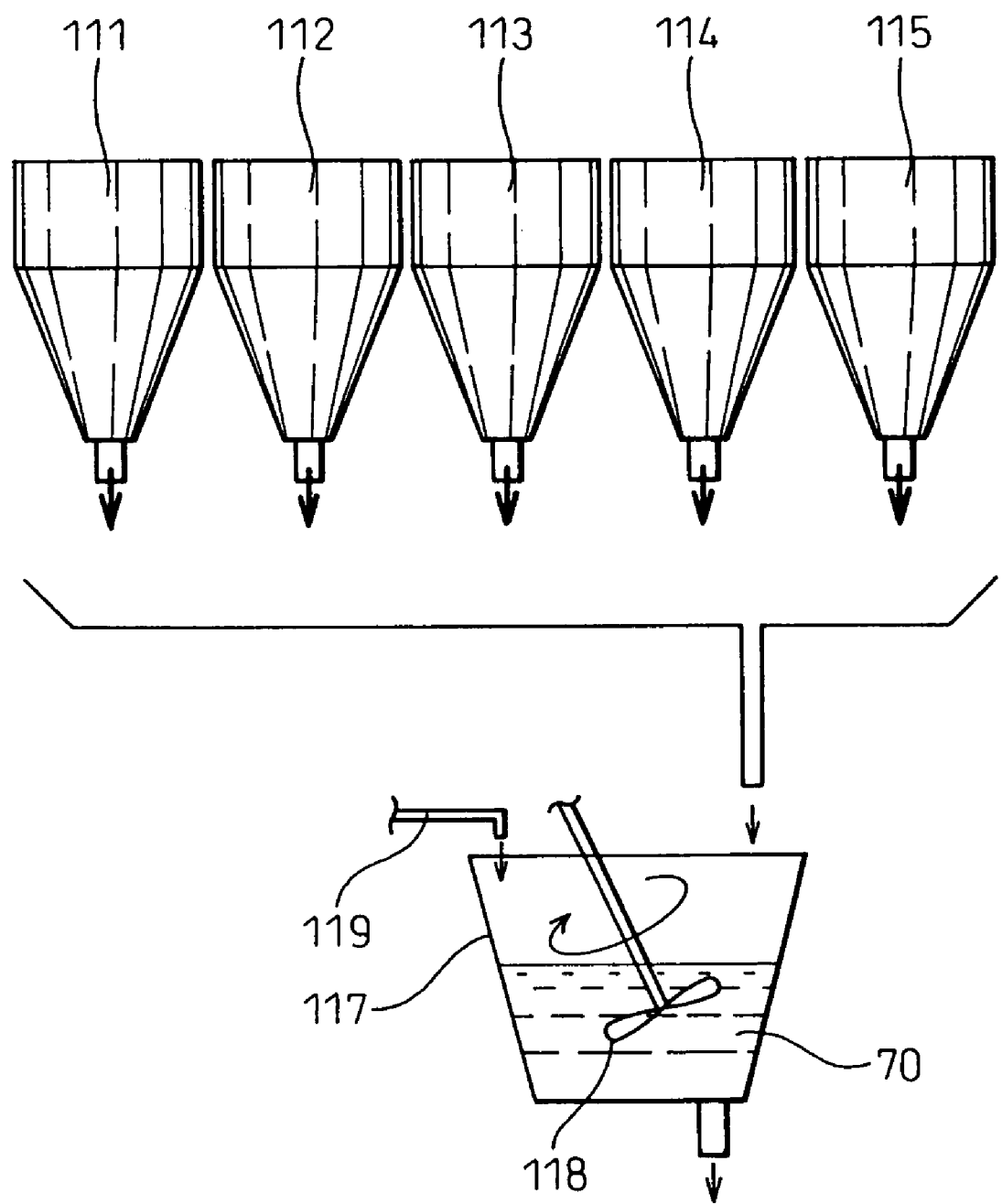
FIG. 3 is an explanatory view showing the state of practicing the starting material treating step in Example 1.

In this Example, as shown in FIG. 3, 100 parts by weight of a virgin starting material 70 is produced from respective starting material powders, more specifically, 38 parts by weight of talc, 42 parts by weight of kaolin and 20 parts by weight of alumina, by the starting material treating step S110 (FIG. 1) which is a pretreatment of the mixing step S120.

In the starting material treating step S110, as shown in FIG. 3, respective proper amounts of powders are weighed from dispensers 111 to 115 holding respective starting material powders to obtain a starting material powder. Thereafter, the starting material powder charged into the stirring bath 117 and water supplied from a supply pipe 119 are stirred by a stirring blade 118 to produce the virgin starting material 70 as a slurry.

In the subsequent mixing step S120, the ceramic starting material 71 comprising the virgin starting material 70 and the reclaimed powder 74 which is a reclaimed ceramic starting material resulting from the treatment of the unnecessary part 888 is mixed with a powdery binder 121. This mixing step was performed using a mixing apparatus.

In the mixing step S120, a methyl cellulose powder as the binder 121, a powder obtained from the virgin starting material 70 in a slurry form and the reclaimed powder 74 are pressure-conveyed by a high-pressure air through respective air-pressure conveying pipes and supplied to a mixing chamber. In this Example, the powder was obtained by using a slurry drier such as paddle drier, fluidized bed drier and spray drier.

In this Example, a virgin starting material 70 was combined with 10 parts by weight of the reclaimed powder 74 based on 100 parts by weight of the virgin starting material to obtain the ceramic starting material in the mixing step S120.

The virgin starting material 70, the reclaimed powder 74 and the binder 121 may be mixed simultaneously as in this Example and it may be considered that the ceramic starting material is produced in this mixing process. Alternatively, the virgin starting material 70 and the reclaimed powder 74 may be previously mixed to produce the ceramic starting material and this ceramic starting material may be mixed with the binder 121.

After a predetermined amount of each powdery starting material in a dried state is charged into the mixing chamber, high-pressure air is jetted into the mixing chamber from an air-pressure conveying apparatus. By this high-pressure air, the respective starting material powders flow into the mixing chamber to produce the mixed starting material where the starting material powders are almost uniformly mixed.

In the subsequent humidifying step S130, a humidifying liquid is added to the mixed starting material to produce a humidified starting material 73. In this Example, as the humidifying liquid, a mixture obtained by mixing polyoxyethylene polyoxypropylene monobutyl ether with water was used.

By using this humidifying liquid, the humidified starting material 73 can be improved in the lubricity and ensured with good extrudability and moldability in the molding step S140.

Figure 4:
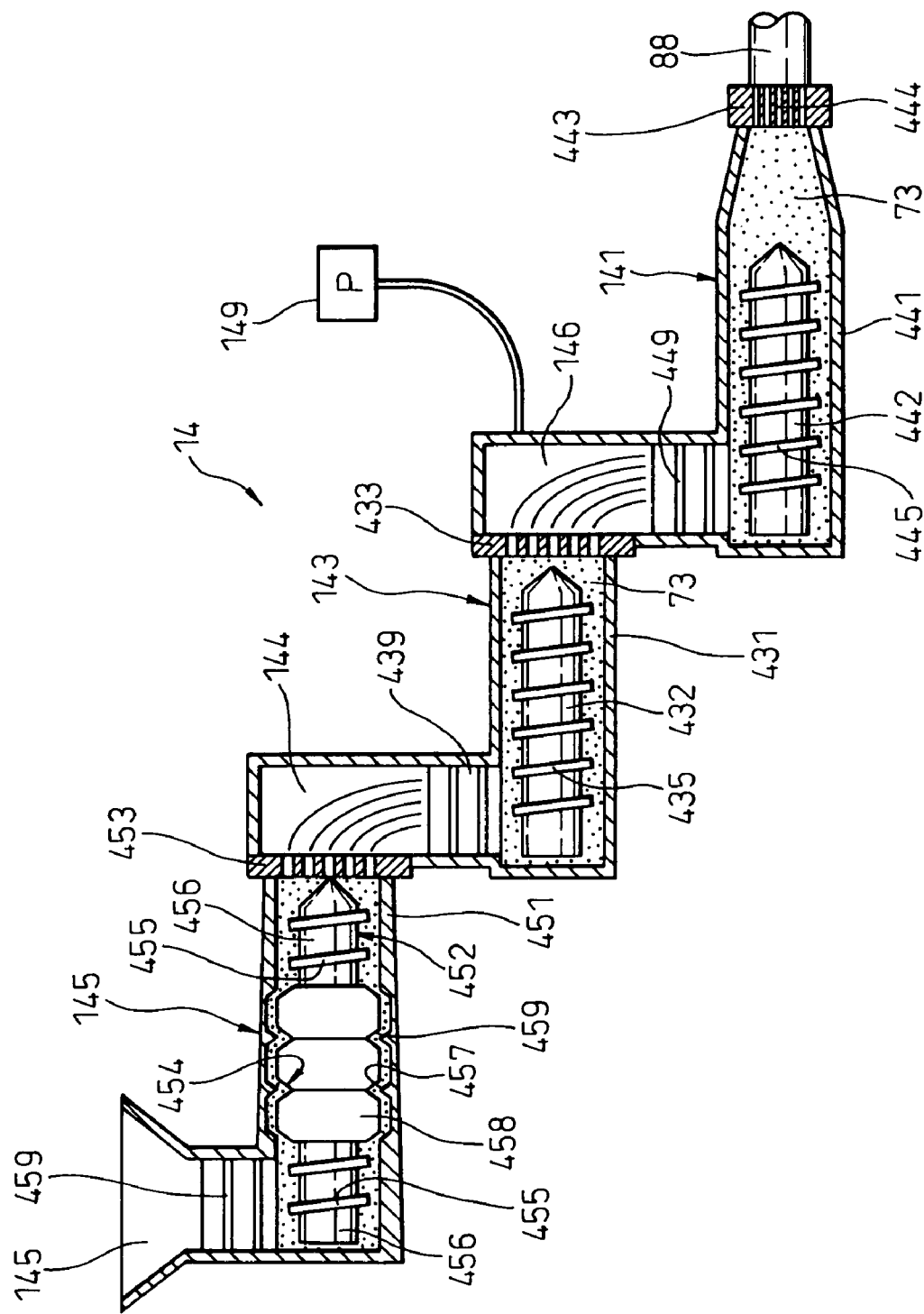
FIG. 4 is a cross-sectional view showing the structure of the molding machine for practicing the molding step in Example 1.

In the subsequent molding step S140, as shown in FIG. 4, the ceramic molded article 88 is extrusion-molded by using a molding machine 14. The molding machine 14 comprises kneaders 143 and 145 for kneading the humidified starting material 73 and a screw-type extruder 141 for extruding the humidified starting material 73 toward a molding die 443 which is described later.

As shown in FIG. 4, the kneader 143 and the extruder 141 each has a cylindrical frame body 431 or 441 and a screw 432 or 442 having spirally wound therearound a screw fin 435 or 445.

Also, as shown in the Figure, the kneader 145 has a cylindrical frame body 451 and a screw 452. The screw 452 comprises a screw part 456 having wound therearound a screw fin 455, which is present at both ends, and a nearly cylindrical large diameter part 458 where a shear groove 459 with an almost constant width is formed over the entire outer circumference. On the inner circumferential surface of the frame body 451, a shear tooth 457 protruding like a ring to engage with the shear groove 459 is formed.

In the kneader 145 of this Example, as shown in FIG. 4, a shear part 454 comprising a combination of the shear groove 459 and the shear tooth 457 is formed at two positions in the axial direction.

The screws 432, 442 and 452 are each rotated by a motor (not shown) connected to respective rear end sides.

In the upper part of the frame body 451 of the kneader 145, as shown in FIG. 4, a material supplying port 145 with a pressing roller 459 designed to press the supplied starting material into the inside is opened. The kneader 145 is constructed such that the humidified starting material 73 or the like supplied from the material supplying port 145 is kneaded and extruded toward a filter 453.

Here, the shear part 454 disposed on the outer circumference in the large diameter part 458 of the screw 452 is designed so that the humidified starting material 73 in the inside of the kneader can be thoroughly kneaded by the shearing action provided by the shear part 454.

In the upper part of the frame body 431 of the kneader 143, as shown in FIG. 4, a material supplying port 144 with a pressing roller 439 is opened. The humidified starting material 73 extruded from the kneader 145 is supplied to the kneader 143 through the material supplying port 144.

Also, as shown in FIG. 4, the kneader 143 is constructed such that the humidified starting material 73 after kneading is extruded toward a filter 433 at the distal end and supplied to the material supplying port 146 of the extruder 141. To this extruder 141, a vacuum pump 149 for evacuating the periphery of the material supplying port 146 is connected, so that entraining of air into the humidified starting material 73 can be prevented by the evacuation.

In the extruder 141, the humidified starting material 73 kneaded by the kneader 143 is further carried forward to a molding die 443. In this Example, grid-like slits 444 corresponding to the partition walls 82 of the produced ceramic molded article 88 are formed in the inside of the molding die 443.

The extruder 141 is constructed such that the ceramic molded article 88 having a honeycomb structure can be formed based on the internal structure of the molding die 443 with slits 444.

The ceramic molded article 88 obtained by extrusion molding is then supplied into the drying step S150. This drying step S150 was performed by using a drying apparatus (not shown) comprising a drying bath equipped with a microwave generator.

Figure 5:
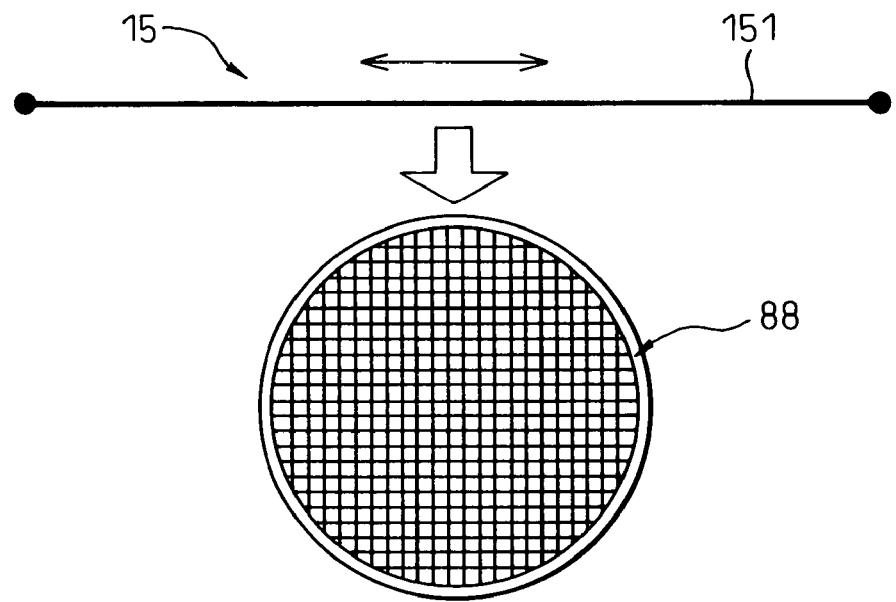
FIG. 5 is an explanatory view showing the wire cutter in Example 1.

In this step, the ceramic molded article 88 is appropriately cut in advance so that the ceramic molded article can be supplied into the drying bath. In this Example, as shown in FIG. 5, a wire cutter 15 designed to cut a clayey ceramic molded article 88 by the reciprocatory motion of a wire 151 was used.

The ceramic molded article 88 after cutting is supplied into the drying bath and irradiated with microwaves. By the irradiation with microwaves, water contained in the clayey ceramic molded article 88 is vaporized and the ceramic molded body 88 is dried.

In order to correct both end faces of the ceramic molded article 88 after drying, the cutting step S160 is performed. In this step, both end faces of the ceramic molded article 88 after drying are cut off to obtain a ceramic molded article 88 as a final cordierite ceramic body 8 (FIG. 2).

More specifically, in the ceramic molded article 88 after drying, distortion generated upon cutting by the wire cutter 15 remains in partition walls near both ends. By appropriately cutting off unnecessary parts 888 at both ends, an end face comprising partition walls 82 reduced in distortion is exposed and at the same time, the length of the ceramic molded article 88 is agreed with the dimension as the final product.

In this Example, the ceramic molded article 88 after drying was cut by a diamond cutter (not shown).

Subsequently, the calcining step S170 is performed to calcine the ceramic molded article 88 and produce a final product cordierite ceramic body 8.

As the post-step of the cutting step S160, the reclaiming step S180 is performed. In this reclaiming step S180, the recovered unnecessary part 888 is crushed to produce a reclaimed powder 74 composed of particles in a predetermined particle size range.

Figure 6:
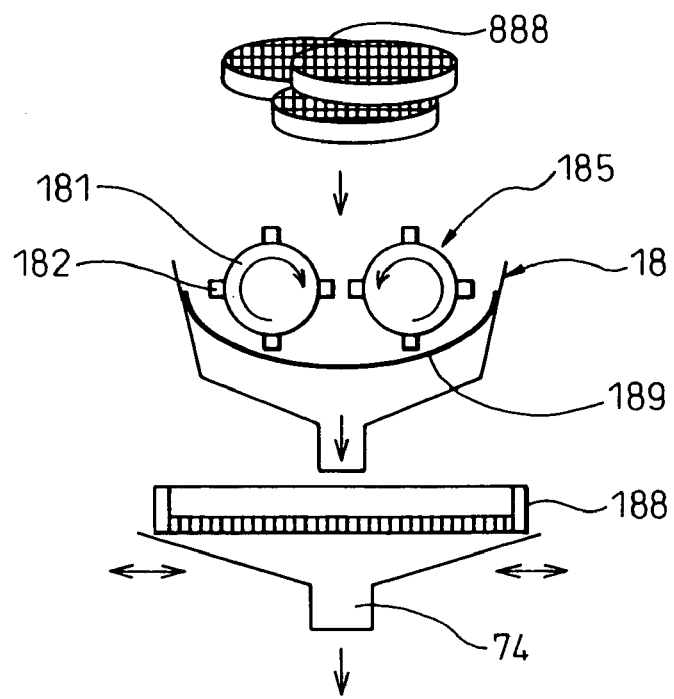
FIG. 6 is an explanatory view showing the state of practicing the reclaiming step in Example 1.

As shown in FIG. 1, the reclaiming step S180 of this Example comprises a crushing treatment S181 and a classifying treatment S182. As shown in FIG. 6, the crushing treatment S181 was performed by using a roll crusher 18 where two paired rotors 181 each having crushing blades 182 on the outer circumferential surface are disposed nearly in parallel and a mesh 189 having 5 mm square meshes is disposed in the downstream side of the rotors 181.

As shown in FIG. 6, the roll crusher 18 is constructed to rotate each rotor 181 so as to draw inwardly the unnecessary part 888 supplied into the space between paired rotors 181.

When the rotors 181 are rotated, the unnecessary part 888 is rubbed against the mesh 189 and passed through the mesh, whereby particles having a particle size of 5 mm or less can be obtained.

In the classifying treatment S182, as shown in FIG. 6, the reclaimed powder 74 as a reclaimed ceramic starting material is produced by using a filter 188 equipped with a filter net having meshes nearly in a 1 mm square shape.

In this treatment, the particles obtained by the crushing treatment S181 are classified and removed by the filter 188 and the particles remaining in the filter 188 are used as the reclaimed powder 74. According to the classifying treatment S182 of this Example, a reclaimed powder 74 composed of scaly particles having a particle size of 1 mm or more can be produced.

In the production method of this Example, the reclaimed powder 74 produced is re-used as a part of the ceramic starting material in the mixing step S120.

As described above, in the mixing step S120 of the method for producing a cordierite ceramic body 8 of this Example, the ceramic starting material comprising the reclaimed powder 74 produced by the reclaiming treatment S180 and the virgin starting material 70 is mixed with methyl cellulose as the binder 121 to produce the mixed starting material.

Accordingly, the unnecessary part 888 cut off from the ceramic molded article 88 after drying can be re-used and a high production efficiency is attained.

Furthermore, in the mixing step S120, an existing production apparatus of dealing with only a virgin starting material 70 can be used as it is and this is efficient.

Also, in the reclaiming step S180 of this Example, the unnecessary part 888 is crushed and classified into particles having a particle size of 1 to 5 mm to produce a reclaimed powder 74.

In the reclaimed powder 74 composed of scaly particles having a particle size of 1 mm or more, as proved in Example 2 later, there is little possibility that primary particles contained in the unnecessary part 888 are made fine, and the produced cordierite ceramic body 8 deteriorates less in the coefficient of thermal expansion.

In addition, the reclaimed powder 74 having a particle size of 5 mm or less allows less air to pass through during the air-pressure conveyance and can be conveyed to the mixing apparatus with high efficiency.

Example 2

In this Example, the effect provided when the reclaimed powder as the reclaimed ceramic starting material in Example 1 is kept to a particle size of 1 mm or more is clarified by various experiments and resulting experimental data.

In the first experiment, the unnecessary part generated from the ceramic molded article after drying was crushed into several kinds of reclaimed powders differing in the particle size within the average particle size range from 0.2 to 6 mm. Thereafter, cordierite ceramic bodies were produced from a ceramic starting material comprising only each reclaimed powder.

When each cordierite ceramic body was measured on the coefficient of thermal expansion, it was found that there is a high correlation between the particle size of reclaimed powders and the thermal expansion coefficient of the produced cordierite ceramic body.

Figure 7:
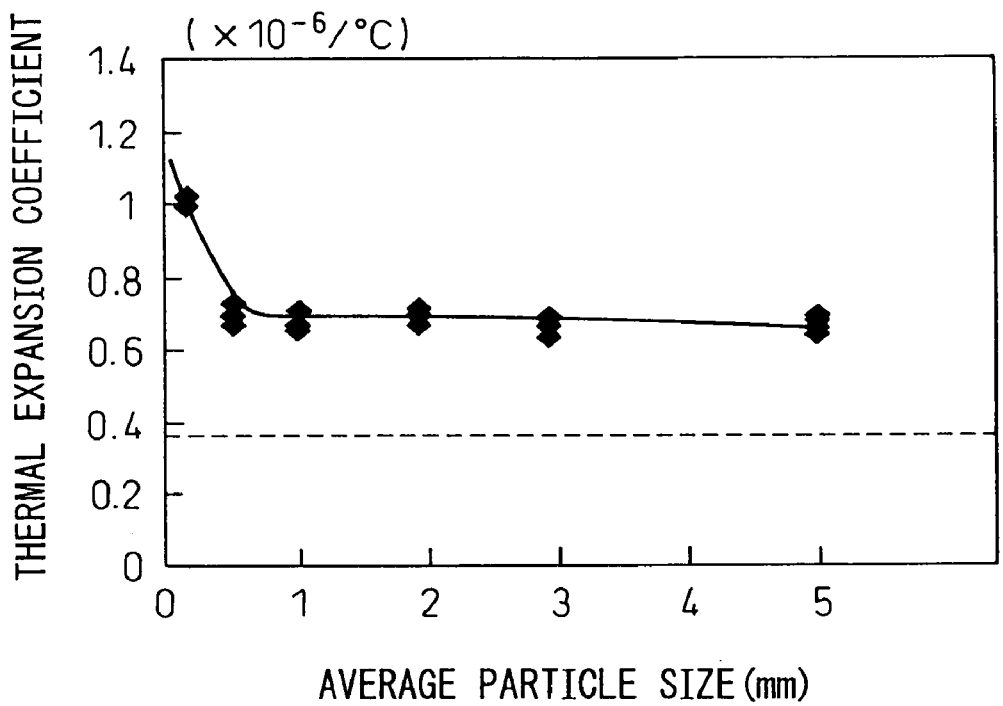
FIG. 7 is a graph showing the relationship between the average particle size of the reclaimed powder and the thermal expansion coefficient of the cordierite ceramic body in Example 2.

That is, as seen from FIG. 7 showing the average particle size of the reclaimed powder used on the abscissa and showing the thermal expansion coefficient of the produced cordierite ceramic body on the ordinate, the thermal expansion coefficient of the cordierite ceramic body abruptly deteriorates (becomes large) when the average particle size of the reclaimed powder is less than 1 mm. Incidentally, the thermal expansion coefficient shown in the Figure is a thermal expansion coefficient in the range from 40 to 80 degrees centigrade.

Also, as seen from the Figure, the thermal expansion coefficient tends to be smaller as the particle size of the reclaimed powder becomes larger but even when the average particle size is made to be 5 mm, the thermal expansion coefficient (shown by a dotted line in the Figure) of a cordierite ceramic body comprising only a virgin starting material cannot be reached.

For clarifying the cause of the correlation between the particle size of the reclaimed powder and the thermal expansion coefficient, in the second experiment, the difference present between two kinds of ceramic starting materials comprising two kinds of reclaimed powders differing in the particle size was examined.

Various properties were analyzed on ceramic starting materials comprising a reclaimed powder classified to a particle size of 1 mm or more and a reclaimed powder classified to a particle size of less than 1 mm, respectively.

Figure 8:
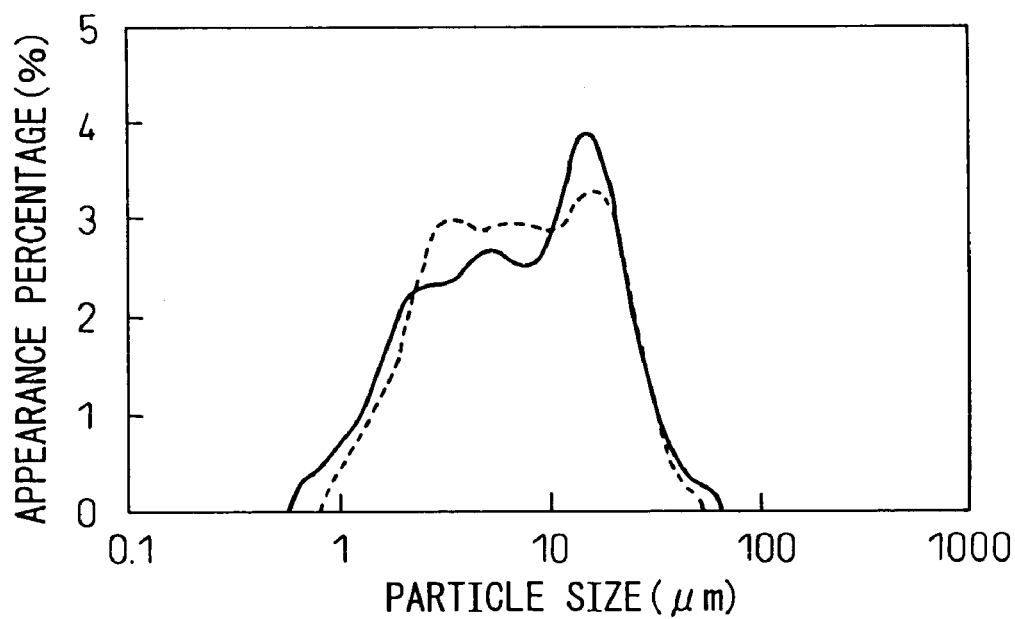
FIG. 8 is a graph showing the primary particle size distribution of the reclaimed powder in Example 2.

As a result, as shown in FIG. 8, the particle size distribution of primary particles greatly differs between two kinds of ceramic starting materials differing in the particle size of the reclaimed powder.

More specifically, in this Figure showing the primary particle size on the abscissa and showing the appearance percentage on the ordinate, the peak of appearance percentage is present at the particle size of about 19 µm in the case of the ceramic starting material comprising a reclaimed powder having a particle size of 1 mm or more (shown by a solid line in the Figure), whereas the peak in the vicinity of 19 µm is suppressed in the case of the ceramic starting material comprising a reclaimed powder having a particle size of less than 1 mm (shown by a dotted line in the Figure).

That is, in the ceramic starting material comprising a reclaimed powder having a particle size of less than 1 mm, the primary particles are made fine.

Figure 9:
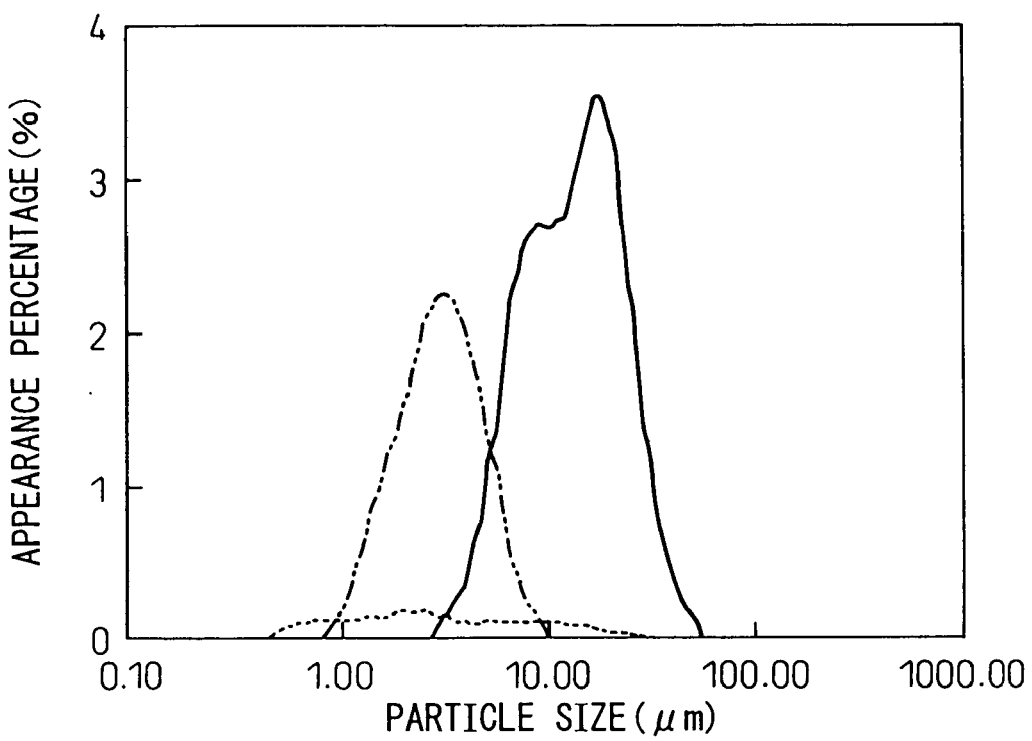
FIG. 9 is a graph showing the primary particle size distribution of each starting material component in the virgin starting material in Example 2.

In the third experiment, as shown in FIG. 9, the primary particle size distribution of each component constituting the virgin starting material used in Example 1 was examined. In the Figure, the primary particle size is shown on the abscissa and the appearance percentage is shown on the ordinate.

Also, in the Figure, the primary particle size distributions of talc, kaolin and alumina are shown by a solid line, a two-dot chain line and a dotted line, respectively.

It is clearly seen from the primary particle size distribution shown in FIG. 9 that the appearance percentage peak present in the vicinity of 19 µm in the particle size distribution of the virgin starting material (FIG. 8) is elicitation of the appearance percentage peak in the primary particle size distribution of talc in a compositional ratio of 38 parts by weight.

To examine the effect of the fined primary particle size, in the fourth experiment, a ceramic starting material containing talc fined to give an appearance percentage peak of the primary particle size in the vicinity of 9.5 µm and a ceramic starting material containing talc having an appearance percentage peak in the vicinity of 19 µm were prepared. Then, cordierite ceramic bodies were produced from these two ceramic starting materials and various properties were compared.

Figure 10:
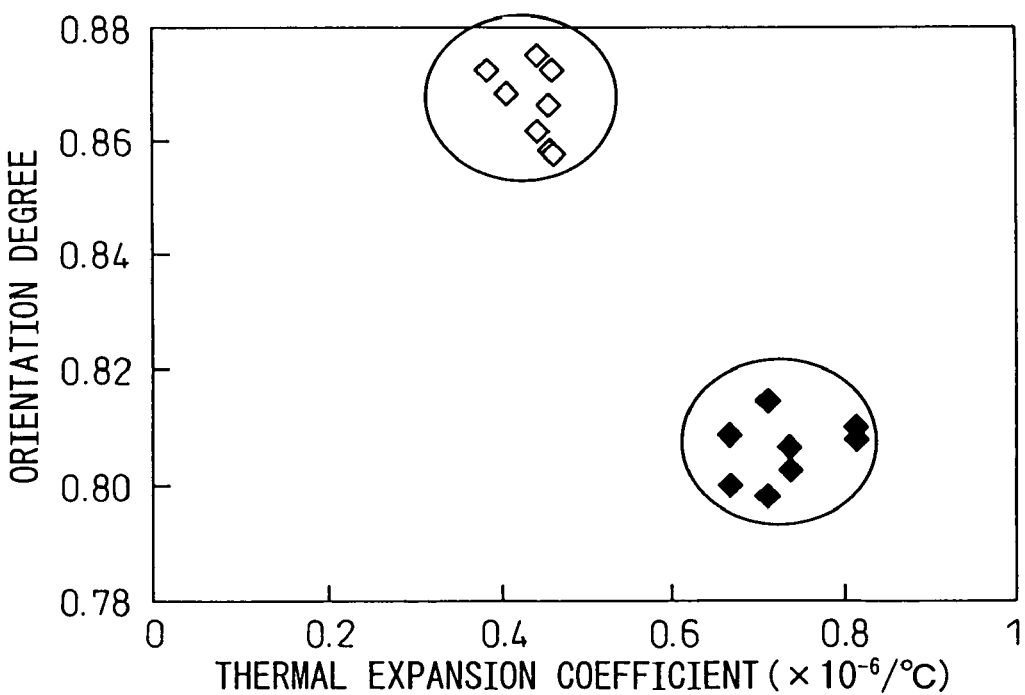
FIG. 10 is a graph showing the relationship between the orientation degree of primary particles in the cordierite ceramic body and the thermal expansion coefficient in Example 2.

As a result, as shown in FIG. 10, the primary particle size of talc has a great effect on the orientation degree indicating the degree of orientation of primary particles in the cordierite ceramic body and on the coefficient of thermal expansion.

In the Figure, the thermal expansion coefficient of the cordierite ceramic body is shown on the abscissa and the orientation degree of the primary particle is shown on the ordinate. Here, the orientation degree is a value obtained by dividing the X-ray intensity of the (110) face by the sum of the X-ray intensity of the (002) face and the X-ray intensity of the (110) face.

As seen from the Figure, the cordierite ceramic body containing talc having an appearance percentage peak in the vicinity of 9.5 μm (shown by black plotted points in the Figure) tends to be small in the orientation degree of the primary particle and large in the thermal expansion coefficient as compared with the cordierite ceramic body comprising talc having an average particle size of 19 μm (shown by white plotted points in the Figure).

In other words, FIG. 10 verifies the mechanism of reduction in the quality of cordierite ceramic body such that the orientation degree decreases due to fining of primary particles of the ceramic starting material and this decrease in the orientation degree gives rise to elevation of the thermal expansion coefficient.

Through these experiments of this Example, the following knowledge was obtained.

As shown in FIG. 10, the primary particle size of the ceramic starting material governs the thermal expansion coefficient of a cordierite ceramic body comprising the ceramic starting material and when the primary particle size becomes small, the coefficient of thermal expansion tends to deteriorate.

As shown in FIG. 8, there is a significant correlation between the primary particle size of the ceramic starting material and the particle size of the reclaimed powder. That is, when the particle size of the reclaimed powder is fined, the primary particle size of the ceramic starting material tends to be small.

When the particle size of the reclaimed powder is 1 mm or more, the fining of primary particles can be prevented.

Figure 11:
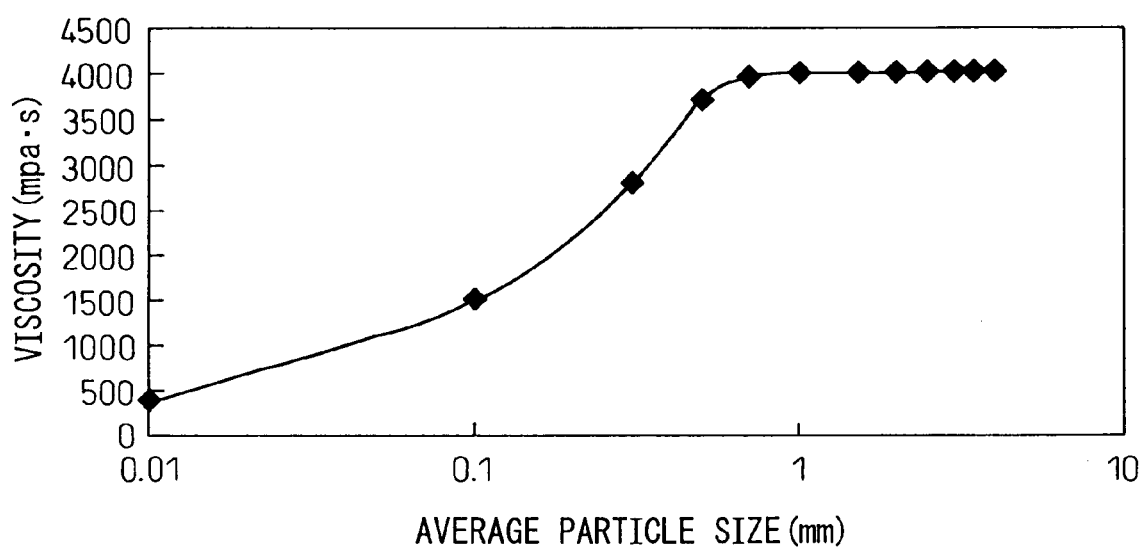
FIG. 11 is a graph showing the relationship between the average primary particle size of the reclaimed powder and the viscosity of the humidified starting material produced from the reclaimed powder in Example 2.

In the fifth experiment, humidified starting materials formed in the humidifying step based on several kinds of reclaimed powders differing in the particle size were measured on the viscosity. As a result, it could be found that as shown in FIG. 11, there is a high correlation between the particle size of the reclaimed powder and the viscosity of the humidified starting material.

More specifically, as seen from the Figure showing the average particle size of the reclaimed powder used on the abscissa and showing the viscosity of the humidified starting material on the ordinate, the viscosity of the humidified starting material abruptly decreases when the average particle size of the reclaimed powder is less than 1 mm.

On the other hand, when the particle size of the reclaimed powder is 1 mm or more, the viscosity of the humidified starting material is stable.

The present inventors presume that the viscosity of the humidified starting material decreases because the ether bond connecting hydroxypropoxy groups with each other in the methyl cellulose as the binder is broken to cause deterioration.

Accordingly, as the reclaimed powder particles are made smaller, the ether bond is broken and the methyl cellulose as the binder is deteriorated to cause decrease in the viscosity of the humidified starting material. As seen from FIG. 11, this tendency is elicited in the reclaimed powder particle size region of less than 1 mm and the effect is small in the reclaimed powder particle size region of 1 mm or more.

In this way, by setting the particle size of the reclaimed powder to be 1 mm or more, the methyl cellulose contained as the binder can be prevented from deteriorating.

By preventing the deterioration of the binder, the methyl cellulose as the binder in the unnecessary part can also be reclaimed and the reclamation efficiency in the entire production process can be more enhanced.

Example 3

In this Example, the effect of the reclaimed powder content in the mixing step was examined based on the production process of a cordierite ceramic body of Example 1.

In this Example, the content of the reclaimed powder occupying in the entire ceramic starting material in the mixing step was changed in the range from 0 to 100 parts by weight and the produced cordierite ceramic bodies were examined on the coefficient of thermal expansion.

Figure 12:
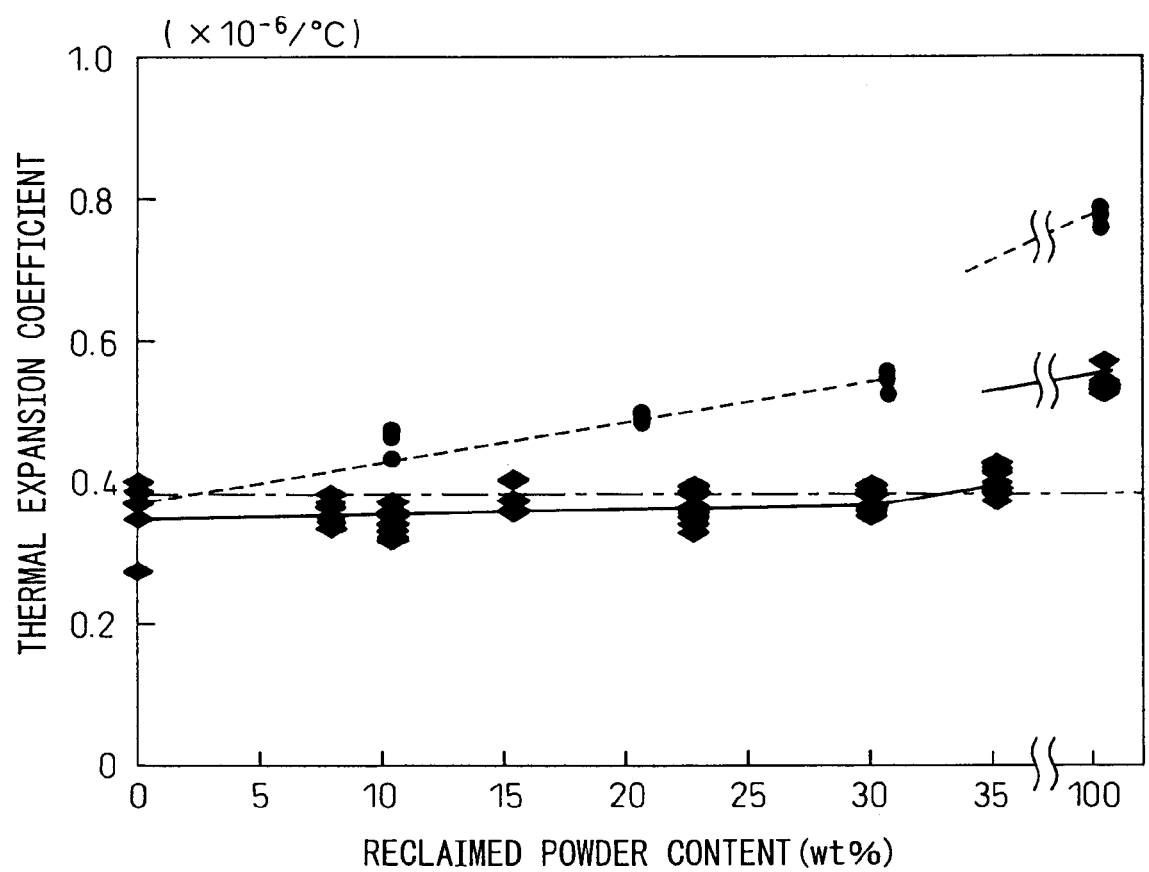
FIG. 12 is a graph showing the relationship between a reclaimed ceramic starting material content based on a virgin ceramic starting material in a ceramic starting material and the thermal expansion coefficient of a cordierite ceramic body produced from the ceramic starting material in Example 3.

As seen from FIG. 12 showing the reclaimed powder content on the abscissa and showing the thermal expansion coefficient of the produced cordierite ceramic body on the ordinate, as the reclaimed powder content in the ceramic starting material is increased, the thermal expansion coefficient of the cordierite ceramic body produced from the ceramic starting material becomes larger.

Also, from the data regarding the reclaimed powder having a particle size of 1 to 5 mm (shown by a solid line and rhombus plotting), it is seen that the reclaimed powder content must be kept to 30 parts by weight or less so as to suppress the deterioration to within 10 percent (the range shown by a one-dot chain line in the Figure) based on the thermal expansion coefficient of the cordierite ceramic body comprising only the virgin starting material.

Incidentally, in FIG. 12, the change (shown by a dotted line and black circle plotting) in the thermal expansion coefficient of a cordierite ceramic body produced from a ceramic starting material containing a reclaimed powder having a particle size of 0.5 to 1 mm is shown as reference. This supports the result, in Example 2, that when the particle size of the reclaimed powder is small, the deterioration of the thermal expansion coefficient is large.

Figure 13:
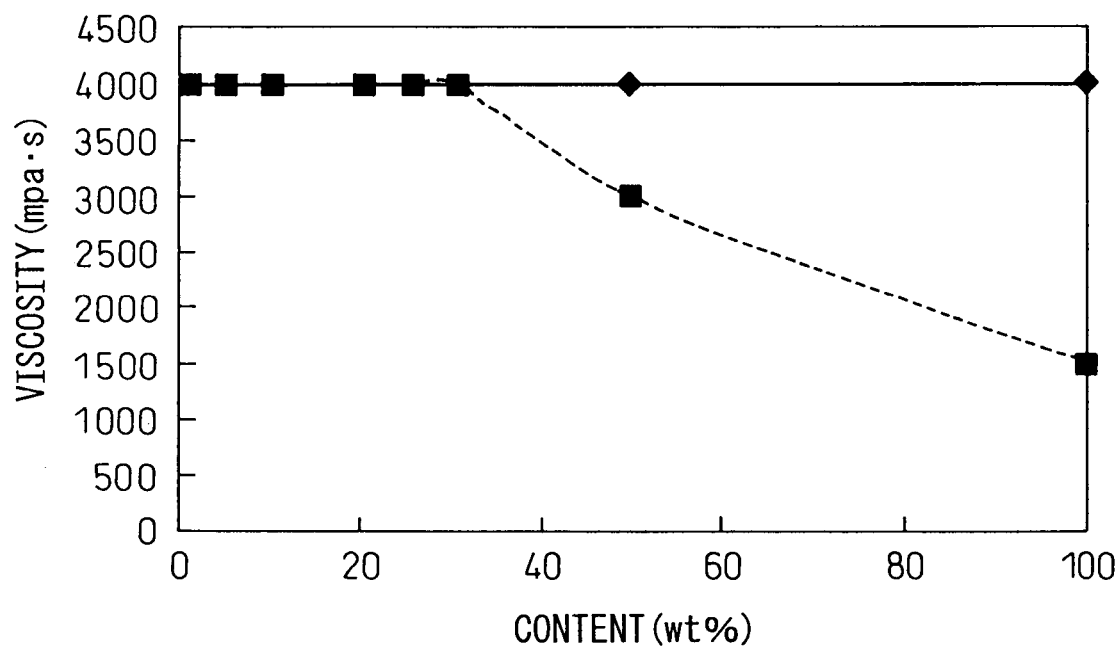
FIG. 13 is a graph showing the relationship between a reclaimed ceramic starting material content based on a virgin ceramic starting material in a ceramic starting material and the viscosity of a humidified starting material produced from the ceramic starting material in Example 3.

The viscosity of the humidified starting material obtained by humidifying a ceramic starting material containing the above-described reclaimed powder was experimentally examined and FIG. 13 shows the results. In the Figure, the reclaimed powder content is shown on the abscissa and the viscosity of the humidified starting material is shown on the ordinate.

In the mixing step of this Example, only methyl cellulose corresponding to the content of the virgin starting material in the ceramic starting material was mixed so as to elicit the deterioration of binder probably occurred in the reclaimed powder.

Therefore, when the binder of the reclaimed powder is deteriorated, the degree of deterioration is shown as the reduction in the viscosity of the humidified starting material.

As seen in the Figure, in the case where the reclaimed powder has a particle size of 1 to 5 mm (shown by a solid line), even when the content in the mixing step is changed, the viscosity of the humidified starting material less fluctuates. This is because in the reclaimed powder having a particle size of 1 to 5 mm, the binder can be prevented from deteriorating.

As reference, the results of an experiment performed in the same manner by using a reclaimed powder having a particle size of 0.07 to 0.5 mm (shown by a dotted line in the Figure) are shown. As apparent from the results of this experiment, in the case of a reclaimed powder composed of fine particles having a particle size of 0.5 mm or less, the viscosity of the humidified starting material decreases due to deterioration of the binder.

When the reclaimed powder content is kept to 30 parts by weight or less, this can provide not only an effect that the deterioration of the binder can be prevented but also an effect that the production of huge secondary particles in the humidifying step can be deterred.

By deterring the production of huge secondary particles resulting from aggregation of crushed particles, the probable generation of troubles such as clogging of molding die or blockage of molding machine can be inhibited.

In the production method using the reclaimed powder as the reclaimed ceramic starting material, huge secondary particles are readily produced in the humidifying step. The present inventors consider that this production is attributable to the binder in the reclaimed powder.

Figure 14:
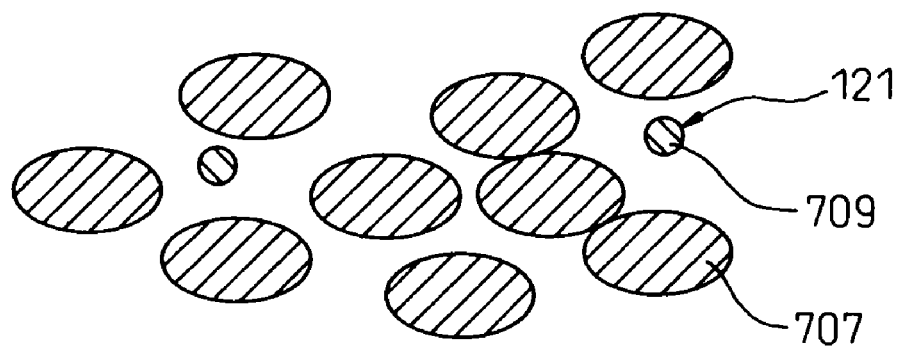
FIG. 14 is an explanatory view showing the state of primary particles in a mixed starting material obtained by mixing a virgin ceramic starting material and a powder binder in Example 3.

In the mixed starting material obtained by mixing a virgin starting material and a fresh binder, as shown in FIG. 14, primary particles 707 of the ceramic starting material and primary particles 709 of the binder 121 are separately present.

Figure 15:
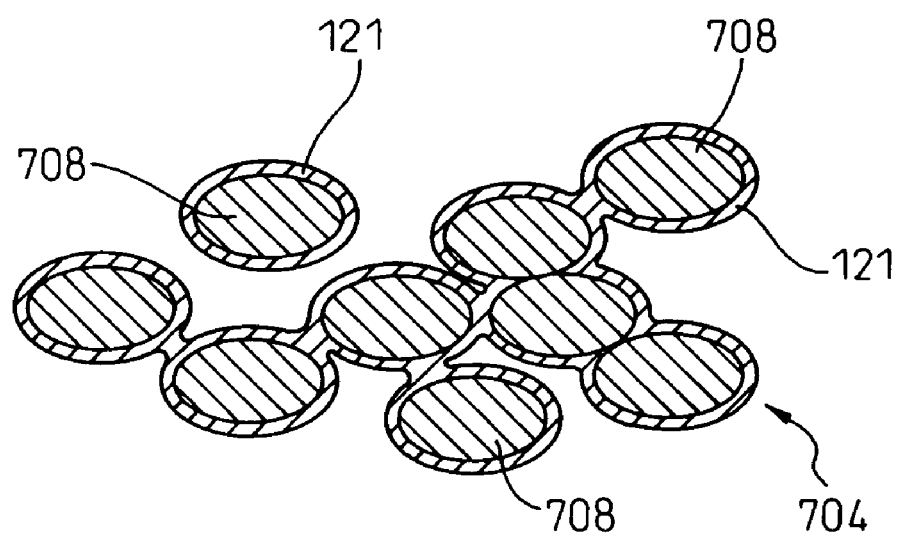
FIG. 15 is an explanatory view showing the state of primary particles of the reclaimed powder in Example 3.

On the other hand, in the reclaimed powder 74 as the reclaimed ceramic starting material, as shown in FIG. 15, primary particles 708 each covered with the binder 121 which was once dissolved and formed into a thin film are aggregated to form secondary particles 704. When the secondary particles 704 comes into contact with a humidifying liquid in the humidifying step, tackiness is generated in the thin-film binder 121 and in turn, the secondary particles 704 as a whole exerts tackiness.

As a result, secondary particles 704 adhere to each other to produce huge secondary particles.

Figure 16:
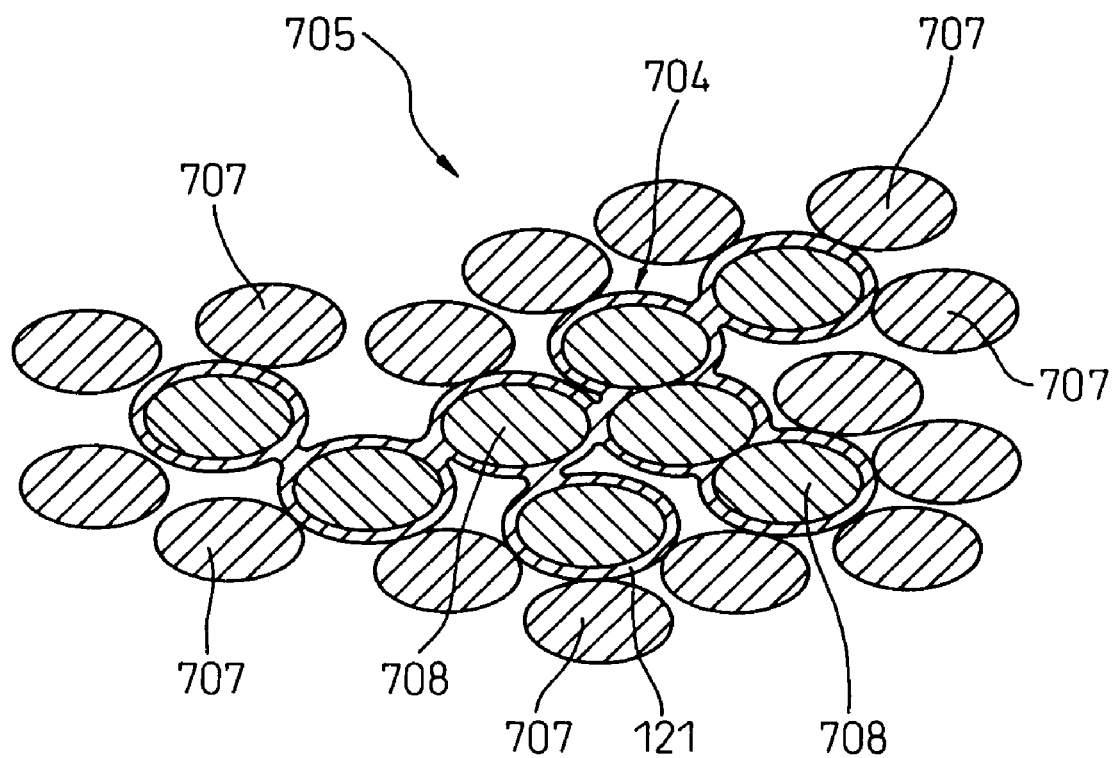
FIG. 16 is an explanatory view showing the state of secondary particles resulting from aggregation of primary particles of the reclaimed powder and primary particles of the virgin starting material in Example 3.

When, as described above, the content of the reclaimed powder 74 is kept to 30 parts by weight or less based on 100 parts by weight of the virgin starting material, a state rich in the primary particles 707 of the virgin starting material in comparison with the secondary particles 704 can be provided as shown in FIG. 16.

In this state, the primary particles 707 of the virgin starting material can be attached to the outer periphery of the secondary particles 704 and the produced secondary particles 705 does not exert adhesive property on the outer surface and has less possibility of growing huge.

Example 4

In this Example, the method for producing the reclaimed ceramic starting material in the method for producing a cordierite ceramic body 8 of Example 1 was changed.

In this Example, in place of the reclaimed powder as the reclaimed ceramic starting material of Example 1, a reclaimed powder obtained by powdering the unnecessary part 888 was used. Furthermore, in this Example, a powdering step S190 was performed in place of the reclaiming step of Example 1. This is described below by referring to FIGS. 17 to 19.

Figure 17:
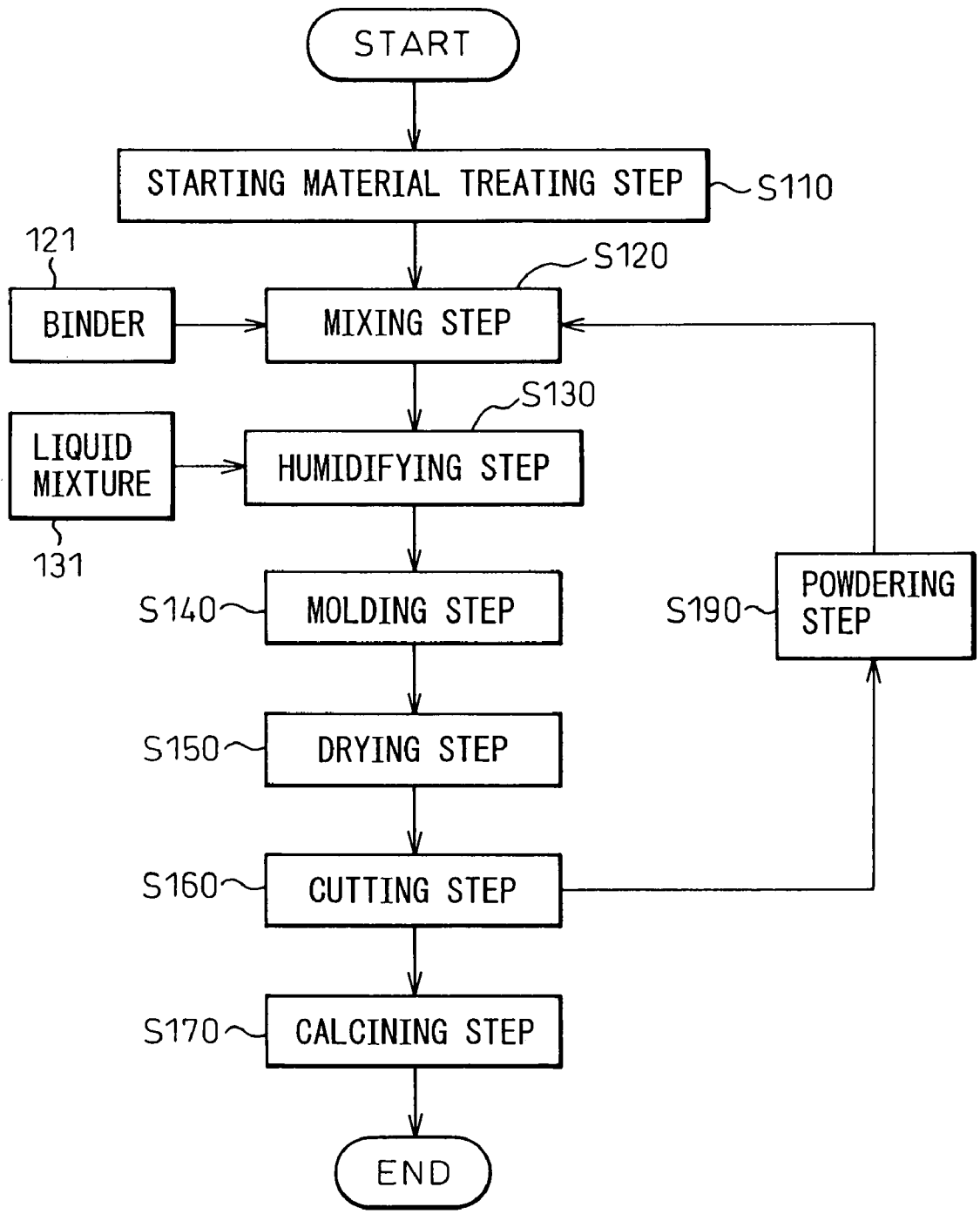
FIG. 17 is a flow chart showing the production process of a cordierite ceramic body in Example 4.

In the mixing step S120 of this Example, as shown in FIG. 17, a methyl cellulose powder as the binder 121, the virgin starting material 70 and the reclaimed powder were mixed to produce the mixed starting material.

That is, in this Example, a starting material comprising the virgin starting material 70 and 30 parts by weight of the reclaimed powder based on 100 parts by weight of the virgin starting material 70 was used as the ceramic starting material for use in the mixing step S120.

In this Example, the input of the binder 121 was adjusted according to the content of the reclaimed powder in the ceramic starting material used in the mixing step S120. The reclaimed powder from which crystal water is vaporized upon firing described later may be low in lubricity and the above-described adjustment is performed to compensate for it by increasing the input of the binder 121.

In this Example, the proper input ratio of the binder 121 to the reclaimed powder is set large as compared with the proper input ratio of the binder 121 to the virgin starting material 70.

Instead of increasing the input of the binder 121, the effect by the crystal water of the reclaimed powder can also be compensated for by increasing the input of the humidifying liquid 131 supplied in the humidifying step S130.

In this Example, as shown in FIG. 17, for producing the reclaimed ceramic starting material, a powdering step S190 is performed as a post-step of the cutting step S160.

In the powdering step S190 of this Example, the recovered unnecessary part 888 is fired to produce the reclaimed powder.

In the powdering step S190, the unnecessary part 888 is fired at 700 degrees centigrade by an electric furnace (not shown) to remove the methyl cellulose as the binder 121 contained in the unnecessary part 888, whereby the powdery reclaimed powder is produced from the unnecessary part 888.

The reclaimed powder produced is, as described above, re-used in the mixing step S120.

In this way, in the production process of a cordierite ceramic body 8 of this Example, the unnecessary part 888 recovered from the cutting step S160 is fired and powdered in the powdering step S190 to produce the powdery reclaimed powder.

In this powdering step S190, crushing or the like of the unnecessary part 888 is not performed and this incurs less destruction of primary particles.

Accordingly, the cordierite ceramic body 8 produced from the ceramic starting material containing the reclaimed powder and the cordierite ceramic body 8 produced from the virgin starting material 70 have less possibility of differing in the thermal expansion coefficient due to difference in the primary particle size between those two starting materials.

Furthermore, in the production method of this Example where the reclaimed powder and the virgin starting material 70 are mixed in the mixing step S120, an existing production apparatus using the virgin starting material can be used as it is and this is efficient.

Also, in this Example, an experiment for examining the primary particle size distributions of the reclaimed powder and the virgin starting material 70 was performed. As a result, as seen from FIG. 18, a great difference was not present in the particle size distribution between the reclaimed powder (shown by a solid line in the Figure) and the virgin starting material 70 (shown by a fine line in the Figure). In the Figure, the primary particle size is shown on the abscissa and the appearance percentage is shown on the ordinate.

In the Figure, a primary particle size distribution of the reclaimed powder produced by crushing in Example 1 (shown by a dotted line) is shown as the reference data.

Furthermore, an experiment for examining the thermal expansion coefficients of several cordierite ceramic bodies 8 produced from only the reclaimed powder and several cordierite ceramic bodies 8 produced from only the virgin starting material 70 was performed. As a result, as seen from FIG. 19, the thermal expansion coefficient distribution of cordierite ceramic bodies produced from the reclaimed powder, which is denoted as Sample 1, almost agrees with the thermal expansion coefficient distribution of cordierite ceramic bodies produced from the virgin starting material 70, which is denoted as Sample 2.

In the Figure, a thermal expansion coefficient distribution of several cordierite ceramic bodies (Sample 3), produced from the reclaimed powder produced by crushing, in Example 1 is shown as the reference data.

Figure 18:
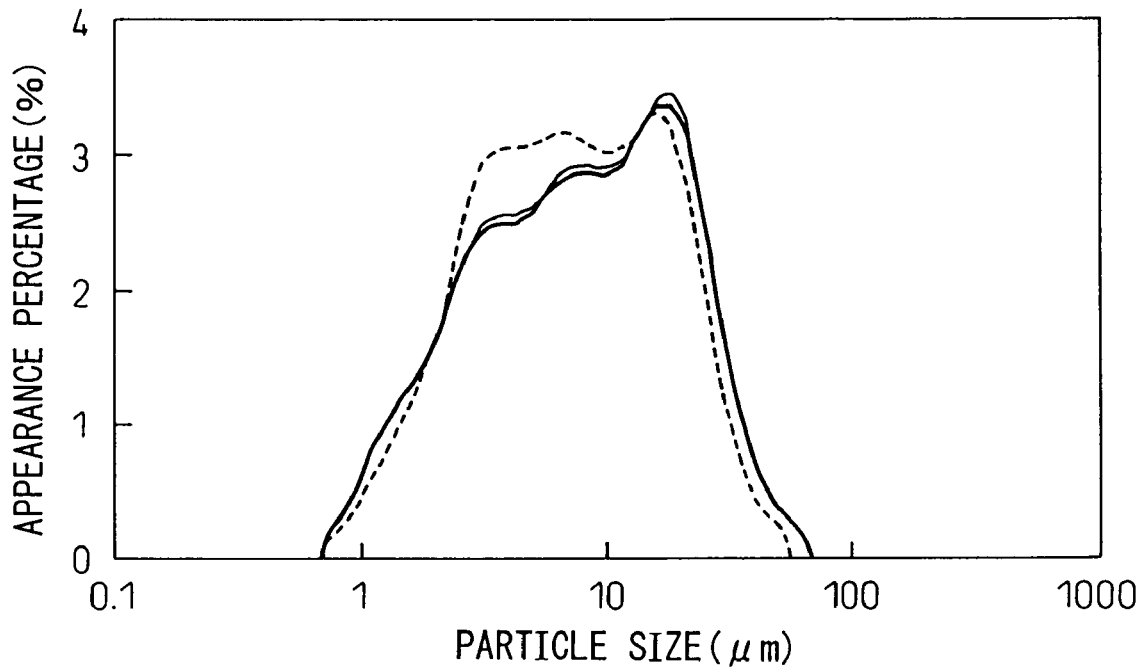
FIG. 18 is a graph showing the primary particle size distribution of the reclaimed powder in Example 4.

According to the powdering step S190, as shown in FIG. 18, the primary particles in the reclaimed powder are not fined.

Figure 19:
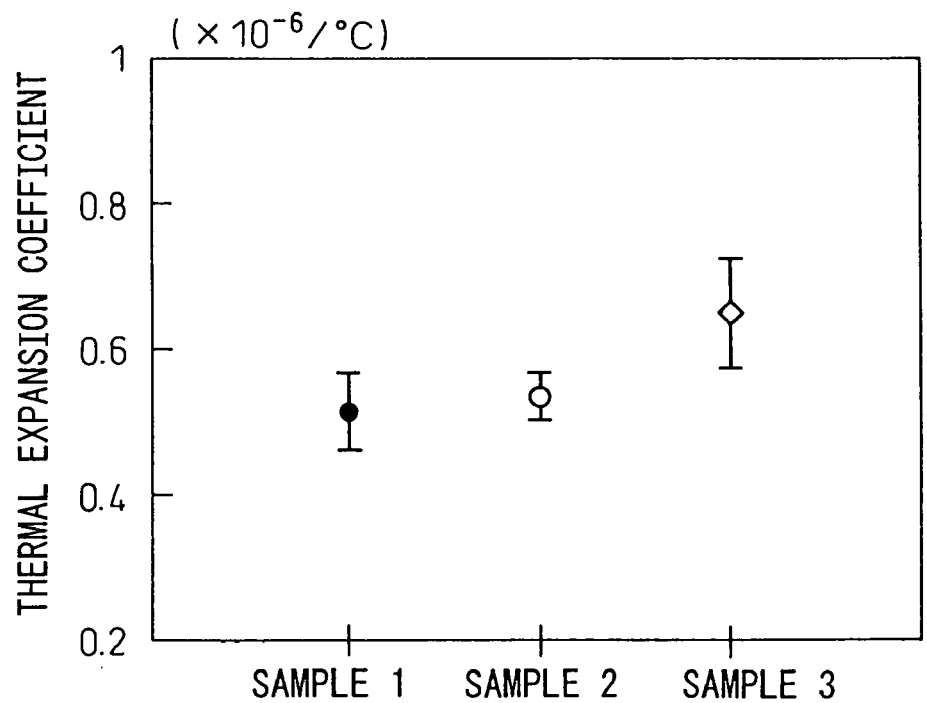
FIG. 19 is a graph showing the thermal expansion coefficient distribution of the cordierite ceramic body produced from the reclaimed powder in Example 4.

From the reclaimed powder giving a primary particle size distribution equal to that of the virgin starting material 70, as shown in FIG. 19, a cordierite ceramic body 8 excellent in the thermal expansion coefficient can be produced.

As described above, a cordierite ceramic body 8 can be well produced from only the reclaimed powder.

However, on considering the amount of the unnecessary part 888 as a scrap generated in the production process, the content of the reclaimed powder is preferably set to from 1 to 30 parts by weight based on 100 parts by weight of the virgin starting material 70 in the mixing step S120.

When the reclaimed powder 75 content is in the above-described range, a cordierite ceramic body 8 stabilized in the quality can be continuously produced with good efficiency from the ceramic starting material prepared by mixing a newly supplied virgin starting material 70 and the reclaimed powder.

Other constitutions and operational effects are the same as those in Example 1.

Example 5

In this Example, the method for re-using the unnecessary part 888 and the combination or the like of starting materials supplied to the mixing step were changed based on the method for producing a cordierite ceramic body of Example 1.

Figure 20:
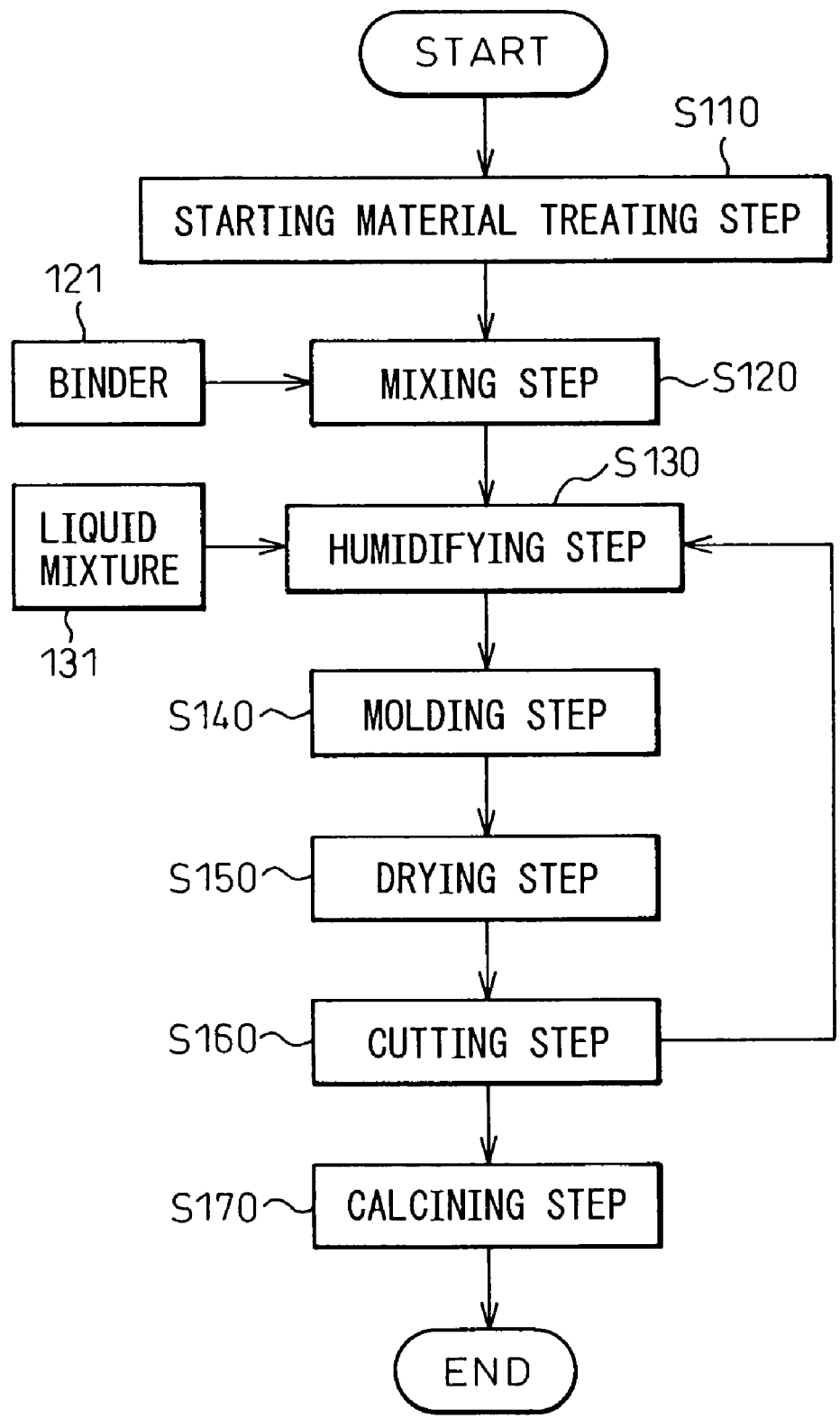
FIG. 20 is a flow chart showing the production process of a cordierite ceramic body in Example 5.

As shown in FIG. 20, the production process of this Example is constituted to directly use the unnecessary part 888 recovered from the cutting step S160 by omitting the reclaiming step.

The mixing step S120 is constituted to produce the mixed starting material by mixing the virgin starting material 70 and methyl cellulose as the binder 121.

Figure 21:
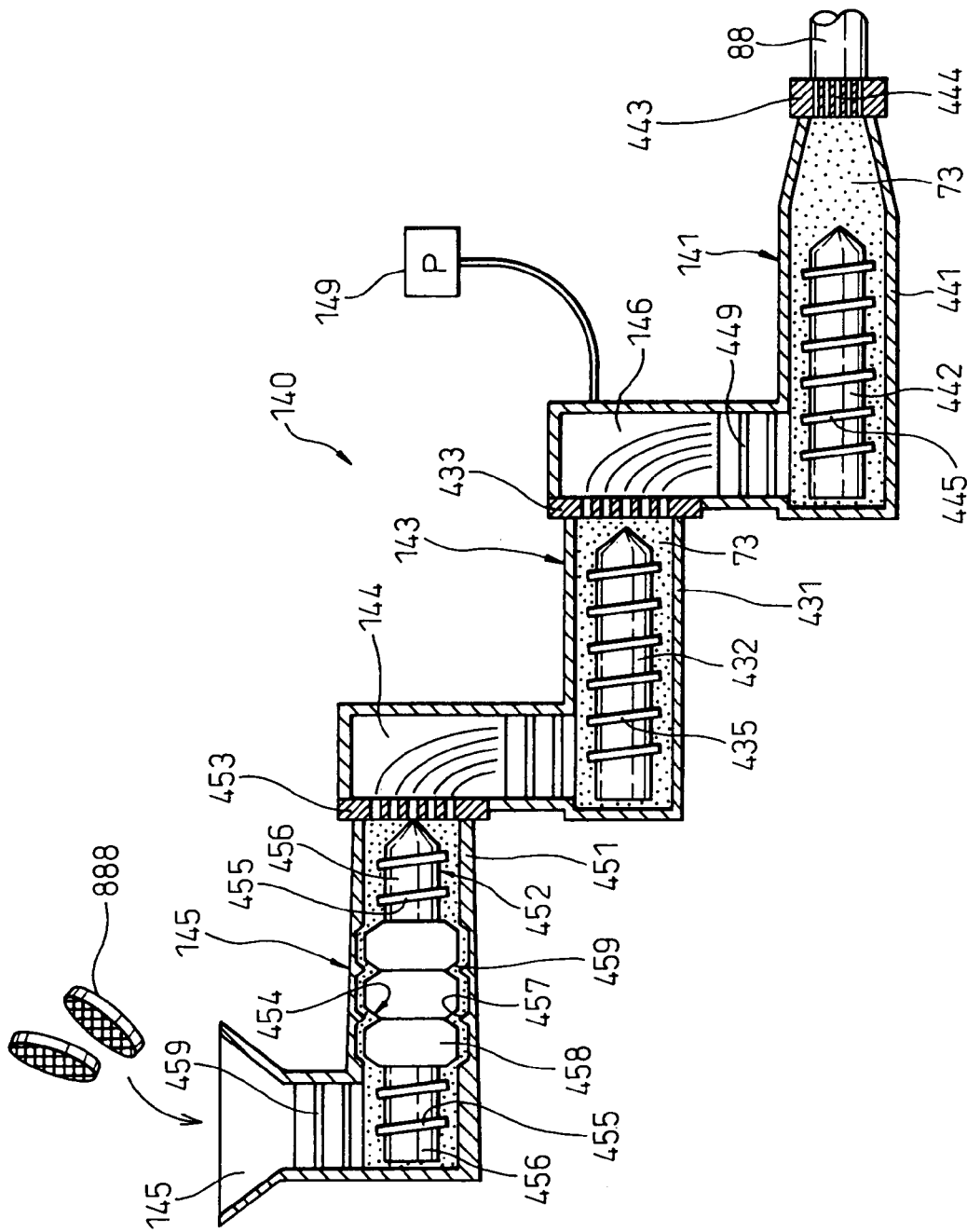
FIG. 21 is a cross-sectional view showing the structure of the molding machine for practicing the humidifying step and the molding step in Example 5.

Furthermore, the molding machine 140 used in this Example is constituted, as shown in FIG. 21, such that the humidifying step S130 and the molding step S140 can be performed at the same time.

In this molding machine 140, the kneading torque is intensified so that the unnecessary part 888 can be supplied directly from the material supplying port 145.

According to the method for producing a cordierite ceramic body 8 of this Example, the mixed starting material, the humidifying liquid and the unnecessary part 888 are supplied into the molding machine 140 and the humidifying step S130 and the molding step S140 are performed at the same time.

In this way, in the production method of this Example, the unnecessary part 888 is not subjected to any treatment but is directly re-kneaded in the molding machine 140. Therefore, this production method is lessened in the generation of, for example, fining of the primary particle size or deterioration of the binder 121 in the unnecessary part 888. In turn, the cordierite ceramic body 8 produced by this production method is lessened in the reduction of quality.

Other constitutions and operational effects are the same as those in Example 1.

In practicing this production method, in addition to the intensification of the kneading torque of the molding machine 140, enhancement of the cooling capacity or the like is sometimes necessary to cope with an increase in the heating value during kneading.

The invention claimed is:

1. A method for producing a cordierite ceramic body, comprising:
    a mixing step of mixing a ceramic starting material comprising a ceramic virgin starting material and reclaimed powder and a binder to produce a mixed starting material,
    a humidifying step of adding a humidifying liquid to the mixed starting material to produce a humidified starting material,
    a molding step of kneading and extruding the humidified starting material to mold a ceramic molded article,
    a drying step of drying the ceramic molded article,
    a cutting step of cutting off an unnecessary part of the ceramic molded article after drying and thereby machining the ceramic molded article into a predetermined length,
    and a calcining step of calcining the ceramic molded article having the predetermined length to produce a ceramic calcined body,
    wherein the method further comprises a reclaiming step of crushing to a powder the unnecessary part generated in the cutting step and then classifying the crushed powder to remove particles having a particle size less than 1 mm to produce a reclaimed powder composed of particles having a size range of 1 mm to 5 mm, and the reclaimed powder is used at least as a part of the ceramic starting material in the mixing step.

2. A method for producing a cordierite ceramic body according to claim 1, wherein in the mixing step, the content of the reclaimed powder in the ceramic starting material is from 1 to 30 parts by weight based on 100 parts by weight of the virgin starting material.

3. A method for producing a cordierite ceramic body according to claim 1, wherein the cordierite ceramic body has a honeycomb structure.

* * * * *